(12) United States Patent
Tomura et al.

(10) Patent No.: US 9,941,694 B2
(45) Date of Patent: Apr. 10, 2018

(54) POWER SUPPLY SYSTEM

(71) Applicant: TOYOTA JIDOSHA KABUSHIKI KAISHA, Toyota-shi, Aichi-ken (JP)

(72) Inventors: Shuji Tomura, Nagakute (JP); Shigeaki Goto, Nagakute (JP); Naoki Yanagizawa, Nagakute (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/206,591

(22) Filed: Jul. 11, 2016

(65) Prior Publication Data

US 2017/0018921 A1 Jan. 19, 2017

(30) Foreign Application Priority Data

Jul. 14, 2015 (JP) ................... 2015-140467

(51) Int. Cl.
*H02M 3/158* (2006.01)
*H02J 1/00* (2006.01)
*H02J 7/00* (2006.01)

(52) U.S. Cl.
CPC .............. *H02J 1/00* (2013.01); *H02J 7/0068* (2013.01); *H02M 3/158* (2013.01)

(58) Field of Classification Search
CPC ........... H02J 1/00; H02J 7/0068; H02M 3/158
USPC ........................................................ 307/82
See application file for complete search history.

(56) References Cited

U.S. PATENT DOCUMENTS

| 6,320,358 B2 * | 11/2001 | Miller ................ H02J 7/1423 307/10.1 |
| 7,615,887 B2 * | 11/2009 | Stancu ................ H02M 3/156 307/10.1 |
| 7,804,196 B2 * | 9/2010 | Watanabe ........... H02M 3/158 307/10.1 |
| 2003/0107352 A1 | 6/2003 | Downer et al. |

(Continued)

FOREIGN PATENT DOCUMENTS

| DE | 102014210326 A | 12/2014 |
| DE | 102014210347 A | 12/2014 |

(Continued)

*Primary Examiner* — Daniel Kessie
(74) *Attorney, Agent, or Firm* — Andrews Kurth Kenyon LLP

(57) ABSTRACT

A power supply system includes first and second DC power supplies and a power converter. The power converter includes first and third semiconductor elements electrically connected between respective nodes of a first node and a second node and a power line, second and fourth semiconductor elements electrically connected between respective nodes of the first node and the second node and a second power line, a fifth semiconductor element electrically connected between the first and second nodes, and first and second reactors. The first reactor is electrically connected in series with the first DC power supply, between the first node and the second power line. The second reactor is electrically connected in series with the second DC power supply, between the second power line and the second node. A control device controls on and off of the switching element included in the semiconductor element.

8 Claims, 21 Drawing Sheets

(56) References Cited

U.S. PATENT DOCUMENTS

| | | | |
|---|---|---|---|
| 2011/0037316 A1* | 2/2011 | Beuss | H02M 3/158 307/9.1 |
| 2013/0134786 A1 | 5/2013 | Ishigaki et al. | |
| 2014/0104907 A1* | 4/2014 | Shimada | H02M 7/487 363/80 |
| 2014/0145694 A1 | 5/2014 | Ishigaki et al. | |
| 2014/0361617 A1* | 12/2014 | Ohnuki | H02M 3/158 307/24 |
| 2014/0361619 A1 | 12/2014 | Ohnuki | |
| 2014/0361622 A1 | 12/2014 | Ohnuki | |
| 2014/0361625 A1* | 12/2014 | Ohnuki | H02J 7/0065 307/71 |
| 2015/0303803 A1* | 10/2015 | Chen | H02M 3/1582 323/271 |
| 2016/0006377 A1* | 1/2016 | Hashimoto | B60L 3/12 290/31 |

FOREIGN PATENT DOCUMENTS

| | | |
|---|---|---|
| DE | 102014210350 A | 12/2014 |
| JP | 3655277 B2 | 6/2005 |
| JP | 2013-013234 A | 1/2013 |
| JP | 2013-046446 A | 3/2013 |
| JP | 5492040 B2 | 5/2014 |
| WO | 2015/133087 A1 | 9/2015 |

\* cited by examiner

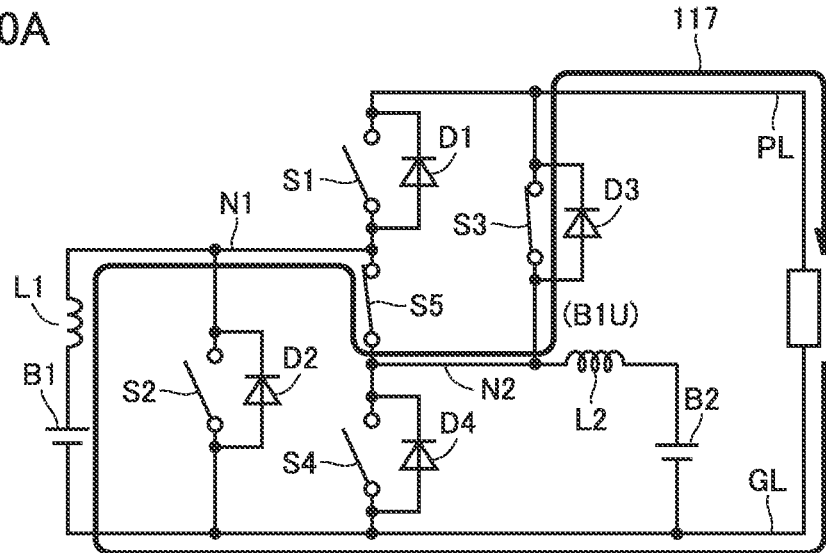
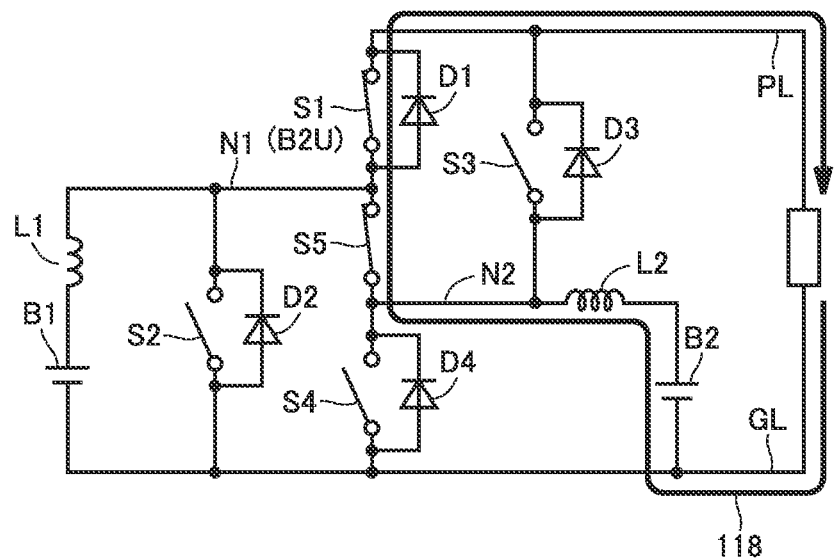

FIG.11

|  |  | S1 | S2 | S3 | S4 | S5 |
|---|---|---|---|---|---|---|
| FIRST ARM (S5:OFF) | B1 UPPER(B1U)ON | ON | OFF | — | — | — |
| | B1 LOWER(B1L)ON | OFF | ON | — | — | — |
| | B2 UPPER(B2U)ON | — | — | ON | OFF | — |
| | B2 LOWER(B2L)ON | — | — | OFF | ON | — |
| SECOND ARM (S5:ON) | B1 UPPER(B1U)ON | — | — | ON | OFF | ON |
| | B1 LOWER(B1L)ON | — | — | OFF | ON | ON |
| | B2 UPPER(B2U)ON | ON | OFF | — | — | ON |
| | B2 LOWER(B2L)ON | OFF | ON | — | — | ON |

FIG.12

| SWITCH | GATE BOOLEAN EXPRESSION |
|---|---|
| S1 | /SD1 |
| S2 | SD1 |
| S3 | /SD2 |
| S4 | SD2 |
| S5 | SD1 XNOR SD2 |

| SD1 | SD2 | S1 | S2 | S3 | S4 | S5 |
|---|---|---|---|---|---|---|
| H (I[1]INCREASE) | L (I[2]DECREASE) | OFF | ON | ON | OFF | OFF |
| H (I[1]INCREASE) | H (I[2]INCREASE) | OFF | ON | OFF | ON | ON |
| L (I[1]DECREASE) | H (I[2]INCREASE) | ON | OFF | OFF | ON | OFF |
| L (I[1]DECREASE) | L (I[2]DECREASE) | ON | OFF | ON | OFF | ON |

(S1, S3 ON)

(S1, S3 ON)

FIG.19
B1 UPPER ARM/B2 UPPER ARM (FIGs. 17A & 17B)

|  | $|IL1|<|IL2|$ | $|IL1|>|IL2|$ |
|---|---|---|
| 115a | IL1 | IL1+IL2 |
| 115b | 0 | −IL2 |
| 116a# | −IL1 | 0 |
| 116b# | IL1+IL2 | IL2 |
| S2 CURRENT | 0 | $|IL1+IL2|$ |
| S4 CURRENT | $|IL1+IL2|$ | 0 |
| S5 CURRENT | $|IL1|$ | $|IL2|$ |

FIG.20
B1 LOWER ARM/B2 LOWER ARM (FIGs. 18A & 18B)

|  | $|IL1|<|IL2|$ | $|IL1|>|IL2|$ |
|---|---|---|
| 117a | IL1 | IL1+IL2 |
| 117b | 0 | −IL2 |
| 118a# | −IL1 | 0 |
| 118b# | IL1+IL2 | IL2 |
| S1 CURRENT | 0 | $|IL1+IL2|$ |
| S3 CURRENT | $|IL1+IL2|$ | 0 |
| S5 CURRENT | $|IL1|$ | $|IL2|$ |

| B1 | LOWER ARM | UPPER ARM | LOWER ARM | UPPER ARM |
|---|---|---|---|---|
| B2 | UPPER ARM | LOWER ARM | LOWER ARM | UPPER ARM |
| Q1 CURRENT | |IL2| | |IL1| | 0 | |IL1+IL2| |
| Q2 CURRENT | 0 | |IL1−IL2| | |IL2| | |IL1| |
| Q3 CURRENT | |IL1| | |IL2| | |IL1+IL2| | 0 |
| Q4 CURRENT | |IL1−IL2| | 0 | |IL1| | |IL2| |

| SWITCH | GATE BOOLEAN EXPRESSION |
| --- | --- |
| S1 | /SD1 |
| S2 | SD1 |
| S3 | /SD2 |
| S4 | SD2 |
| S5a | SD1 or /SD2 (SD1 XNOR SD2) |
| S5b | /SD1 or SD2 (SD1 XNOR SD2) |

FIG.29

| MODE | POWER SUPPLY | OUTPUT VOLTAGE | S1 | S2 | S3 | S4 | S5 (S5a,S5b) |
|---|---|---|---|---|---|---|---|
| PARALLEL BOOST | B1, B2 | VH → VH* | ON/OFF CONTROL IN ACCORDANCE WITH FIG. 12 (FIG. 28) | | | | |
| B1 BOOST | ONLY B1 | VH → VH* | /SD1 | SD1 | FIX TO OFF | FIX TO OFF | FIX TO OFF |
| B2 BOOST | ONLY B2 | VH → VH* | FIX TO OFF | FIX TO OFF | /SD2 | SD2 | FIX TO OFF |
| B1 DIRECT COUPLING | ONLY B1 | V[1] (>V[2]) | FIX TO ON | FIX TO OFF | FIX TO OFF | FIX TO OFF | FIX TO OFF |
| B2 DIRECT COUPLING | ONLY B2 | V[2] (>V[1]) | FIX TO OFF | FIX TO OFF | FIX TO ON | FIX TO OFF | FIX TO OFF |
| PARALLEL DIRECT COUPLING | B1, B2 | max(V[1],V[2]) | FIX TO ON | FIX TO OFF | FIX TO ON | FIX TO OFF | FIX TO OFF |

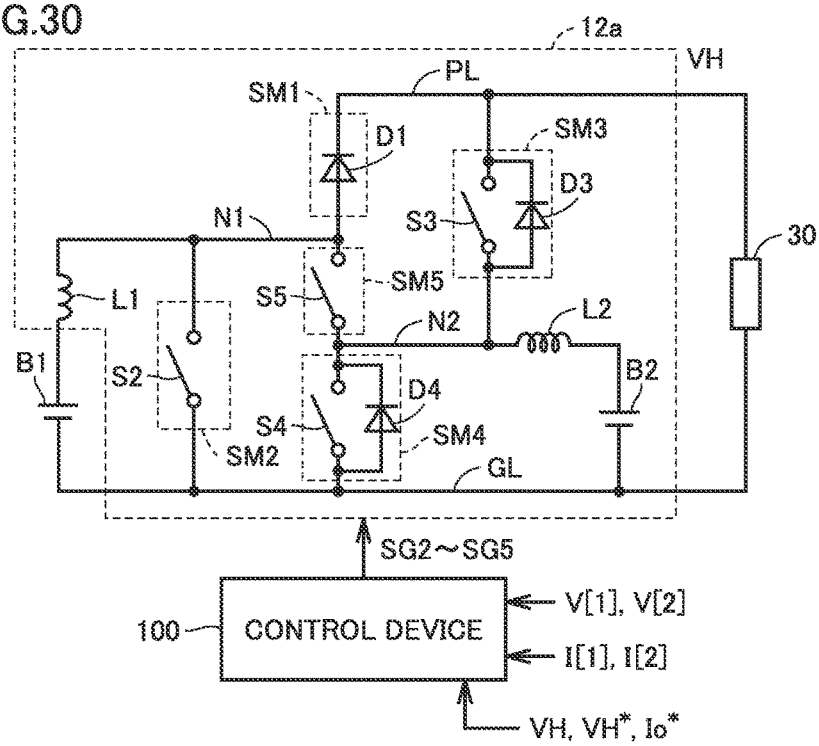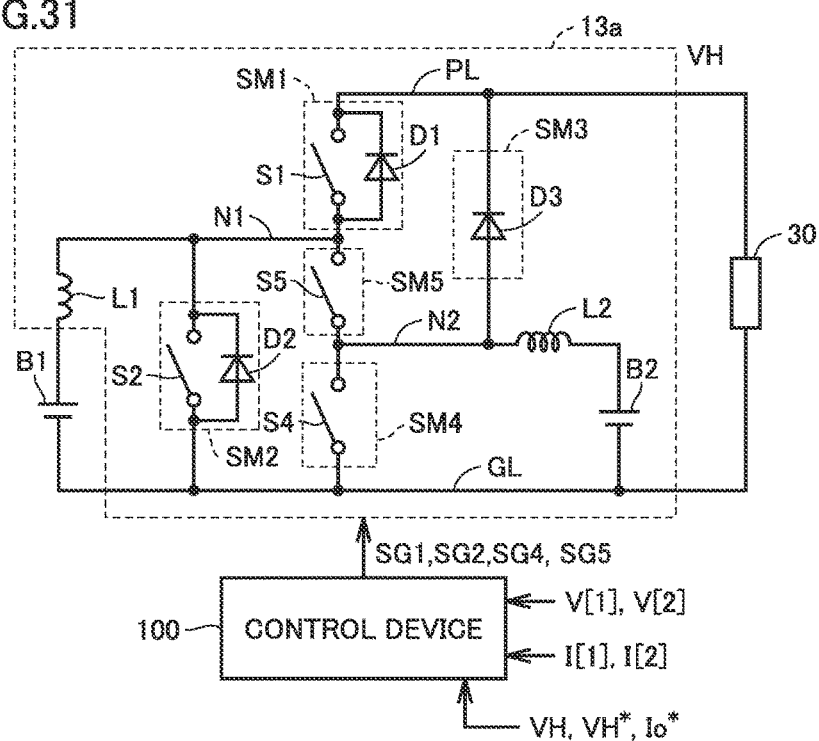

POWER SUPPLY SYSTEM

This nonprovisional application is based on Japanese Patent Application No. 2015-140467 filed with the Japan Patent Office on Jul. 14, 2015, the entire contents of which are hereby incorporated by reference.

BACKGROUND OF THE INVENTION

Field of the Invention

This invention relates to a power supply system, and more particularly to a power supply system configured to include a power converter connected between two direct-current (DC) power supplies and a common power line.

Description of the Background Art

A hybrid power supply system supplying, by using a power converter connected between a plurality of power supplies and a load, power supply to the load with the plurality of power supplies being combined, has been employed.

For example, Japanese Patent Laying-Open No. 2013-46446 (Patent Document 1) describes a power supply system for a vehicle in which boost choppers (power converters) provided for each of a secondary battery and an auxiliary power supply which can be charged and discharge are connected in parallel.

Japanese Patent Laying-Open No. 2013-13234 (Patent Document 2) describes a configuration of a power converter capable of switching between an operation mode in which DC/DC conversion is carried out while two DC power supplies are connected in series (a series connection mode) and an operation mode in which DC/DC conversion is carried out while two DC power supplies are used in parallel (a parallel connection mode) by changing a switching pattern of a plurality of switching elements.

SUMMARY OF THE INVENTION

Since the power converter described in Patent Document 1 can control a ratio of power allocation between the secondary battery and the auxiliary power supply used in parallel, electric power supply to the load can be controlled, with charging and discharging power of the secondary battery being allowed to have a degree of freedom. Consequently, an opportunity for overcoming high-rate deterioration of the secondary battery can be ensured. The secondary battery and the auxiliary power supply, however, cannot be connected in series to each other, and hence a ratio of boost by the boost chopper is higher when a load voltage is high. Thus, increase in iron loss in a reactor or a power loss caused by current ripples lowers efficiency of the power supply system.

In the power converter described in Patent Document 2, by suppressing a boost ratio by selecting the series connection mode, a power loss in particular during output of a high voltage can be suppressed as compared with the configuration in Patent Document 1. In the circuit configuration in Patent Document 2, however, such a phenomenon occurs that a current for electric power conversion for a first DC power supply and a current for electric power conversion for a second DC power supply flow through a common switching element as being superimposed on each other. Thus, increase in conduction loss in the switching element depending on an amount of current which passes as compared with Patent Document 1 is concerned.

This invention was made to solve such problems, and an object thereof is to reduce a power loss in a power supply system including two DC power supplies and achieving higher efficiency in DC electric power conversion.

According to one aspect of this invention, a power supply system to control a DC voltage between a first power line on a high voltage side and a second power line on a low voltage side includes a first DC power supply, a second DC power supply, a power converter, and a control device configured to control an operation of the power converter. The power converter is configured to carry out DC voltage conversion between the first and second DC power supplies and the first and second power lines. The power converter includes first to fifth semiconductor elements and first and second reactors. The first semiconductor element is electrically connected between the first power line and a first node. The second semiconductor element is electrically connected between the second power line and the first node. The third semiconductor element is electrically connected between the first power line and a second node. The fourth semiconductor element is electrically connected between the second power line and the second node. The fifth semiconductor element is electrically connected between the first node and the second node. The first reactor is electrically connected in series with the first DC power supply, between the first node and the second power line. The second reactor is electrically connected in series with the second DC power supply, between the second node and the second power line. At least some of the first to fifth semiconductor elements each include a switching element configured to control formation and cut-off of a current path in response to a signal from the control device. The power converter operates as switching among a plurality of operation modes different in manner of DC voltage conversion, by switching a manner of on/off control of the switching element by the control device.

Therefore, a primary advantage of this invention is that a power loss in a power supply system including two DC power supplies can be reduced and higher efficiency in DC electric power conversion can be achieved.

The foregoing and other objects, features, aspects and advantages of this invention will become apparent from the following detailed description of this invention when taken in conjunction with the accompanying drawings.

BRIEF DESCRIPTION OF THE DRAWINGS

FIG. 6 is a circuit diagram showing a current path when a lower arm of each DC power supply in the equivalent circuit diagram shown in FIG. 5 is turned on.

FIG. 7 is a circuit diagram showing a current path when an upper arm of each DC power supply in the equivalent circuit diagram shown in FIG. 5 is turned on.

FIGS. 9A and 9B are first and second circuit diagrams each showing a current path when the lower arm of each DC power supply in the equivalent circuit diagram shown in FIG. 8 is turned on.

FIGS. 10A and 10B are first and second circuit diagrams each showing a current path when the upper arm of each DC power supply in the equivalent circuit diagram shown in FIG. 8 is turned on.

FIG. 11 is a chart showing correspondence between on and off of each arm of the boost chopper circuit including a first arm and a second arm and on and off of a switching element.

FIG. 12 is a chart showing a list of gate Boolean expressions for controlling on and off of each switching element in the parallel boost mode of the power converter according to the first embodiment.

FIG. 19 is a chart showing in a list, current values in each portion in FIG. 17B.

FIG. 20 is a chart showing in a list, current values in each portion in FIG. 18B.

FIG. 29 is a chart showing a list of a plurality of operation modes applied to the power converter according to the first and second embodiments.

FIG. 30 is a circuit diagram showing a modification of the configuration of the power converter shown in FIG. 1 when a first DC power supply is not regeneratively charged.

FIG. 31 is a circuit diagram showing a modification of the configuration of the power converter shown in FIG. 1 when a second DC power supply is not regeneratively charged.

DESCRIPTION OF THE PREFERRED EMBODIMENTS

Figure 1:
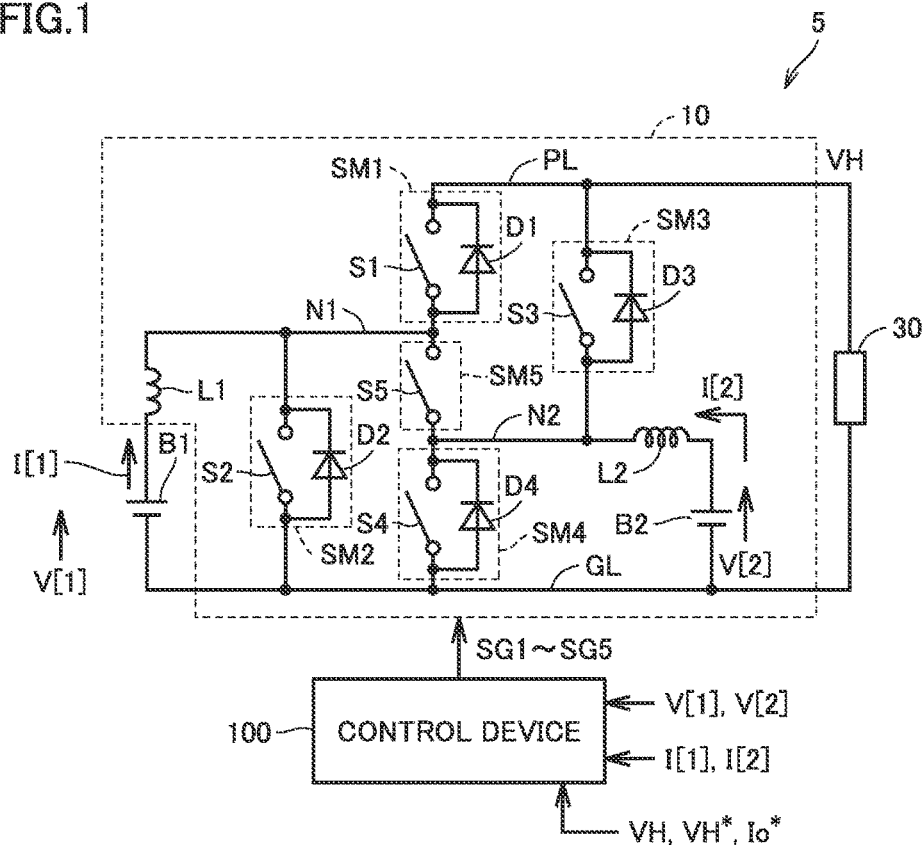
FIG. 1 is a circuit diagram showing a configuration of a power supply system according to a first embodiment of the present invention.

In the following, embodiments of the present invention will be described in detail with reference to the figures. In the figures, the same or corresponding portions are denoted by the same reference characters and description thereof will not be repeated in principle.

First Embodiment (Circuit Configuration)

FIG. 1 is a circuit diagram showing a configuration of a power supply system according to a first embodiment of the present invention.

Referring to FIG. 1, a power supply system 5 includes a DC power supply B1, a DC power supply B2, a power converter 10, and a control device 100.

In the present embodiment, DC power supplies B1 and B2 are implemented by such a power storage device as a secondary battery or an electric double layer capacitor. For example, DC power supply B1 is implemented by such a secondary battery as a lithium ion secondary battery or a nickel metal hydride battery. DC power supply B2 is implemented by a DC voltage source element excellent in output characteristics, such as an electric double layer capacitor or a lithium ion capacitor. DC power supply B1 and DC power supply B2 correspond to the "first DC power supply" and the "second DC power supply," respectively.

DC power supplies B1 and B2 may also be implemented by power storage devices of the same type. A capacity of DC power supplies B1 and B2 is not particularly limited either. DC power supplies B1 and B2 may be implemented to be equal in capacity to each other, or one DC power supply may be higher in capacity than the other DC power supply.

Power converter 10 is configured to control a DC voltage VH (hereinafter also referred to as an output voltage VH) between a power line PL on a high voltage side and a power line GL on a low voltage side. Power line GL is representatively implemented by a ground line.

A load 30 operates as it receives output voltage VH from power converter 10. A voltage command value VH* of output voltage VH is set to a voltage suitable for an operation of load 30. Voltage command value VH* may variably be set depending on a state of load 30. Alternatively, load 30 may be configured to be able to generate charging power for DC power supply (power supplies) B1 and/or B2 through regenerative power generation.

Power converter 10 includes power semiconductor switching elements S1 to S5 and reactors L1 and L2. In the present embodiment, an insulated gate bipolar transistor (IGBT), a power metal oxide semiconductor (MOS) transistor, or a power bipolar transistor can be employed as the power semiconductor switching elements (hereinafter also simply referred to as a "switching element").

On and off of switching elements S1 to S5 can be controlled in response to control signals SG1 to SG5 from control device 100, respectively. Specifically, switching elements S1 to S5 can form current paths as they are turned on when control signals SG1 to SG5 are at the logic high level (hereinafter also denoted as the "H level"). On the other hand, switching elements S1 to S5 cut off the current paths as they are turned off when control signals SG1 to SG5 are at the logic low level (hereinafter also denoted as the "L level").

Diodes D1 to D4 are connected in anti-parallel to switching elements S1 to S4, respectively. Diodes D1 to D4 are arranged to each form a current path in a direction from power line GL toward power line PL (in the drawings, a direction upward from below) during forward biasing. On the other hand, diodes D1 to D4 form no current path during reverse biasing. Specifically, diode D1 is connected to have a direction from a node N1 toward power line PL as a forward direction, and diode D2 is connected to have a direction from power line GL toward node N1 as the forward direction. Similarly, diode D3 is connected to have a direction from a node N2 toward power line PL as the forward direction, and diode D4 is connected to have a direction from power line GL toward node N2 as the forward direction.

Switching element S1 is electrically connected between power line PL and node N1. Reactor L1 and DC power supply B1 are electrically connected in series between node N1 and power line GL. For example, reactor L1 is electrically connected between a positive electrode terminal of DC power supply B1 and node N1, and a negative electrode terminal of DC power supply B1 is electrically connected to power line GL. Switching element S2 is electrically connected between node N1 and power line GL. Even when an order of connection of reactor L1 and DC power supply B1 is interchanged, an electrically equivalent circuit configuration is maintained.

Switching element S3 is electrically connected between power line PL and node N2. Switching element S4 is electrically connected between node N2 and power line GL. Switching element S5 is electrically connected between nodes N1 and N2. Reactor L2 and DC power supply B2 are electrically connected in series between node N2 and power line GL. For example, reactor L2 is electrically connected between a positive electrode terminal of DC power supply B2 and node N2 and a negative electrode terminal of DC power supply B2 is electrically connected to power line GL. Even when an order of connection of reactor L2 and DC power supply B2 is interchanged, an electrically equivalent circuit configuration is maintained.

In the configuration example in FIG. 1, switching element S1 and diode D1 correspond to a "first semiconductor element SM1," switching element S2 and diode D2 correspond to a "second semiconductor element SM2," and switching element S3 and diode D3 correspond to a "third semiconductor element SM3." Switching element S4 and diode D4 correspond to a "fourth semiconductor element SM4" and switching element S5 corresponds to a "fifth semiconductor element SM5." Reactors L1 and L2 correspond to the "first reactor" and the "second reactor," respectively. In the example in FIG. 1, by controlling on and off of switching elements S1 to S5, formation and cut-off of a current path can be controlled in first semiconductor element SM1 to fifth semiconductor element SM5.

Control device 100 is implemented, for example, by an electronic control unit (ECU) having a central processing unit (CPU) and a memory which are not shown. Control device 100 is configured to perform operation processing using a detection value from each sensor, based on a map and a program stored in the memory. Alternatively, at least a part of control device 100 may be configured to perform prescribed numeric and logical operation processing with such hardware as an electronic circuit.

Control device 100 generates control signals SG1 to SG5 controlling on and off of switching elements S1 to S5 for controlling output voltage VH. Though illustration is not provided in FIG. 1, detectors (voltage sensors) for a voltage (denoted as V[1]) and a current (denoted as I[1]) of DC power supply B1, a voltage (denoted as V[2]) and a current (denoted as I[2]) of DC power supply B2, and output voltage VH are provided. Outputs from these detectors are provided to control device 100.

Figure 2:
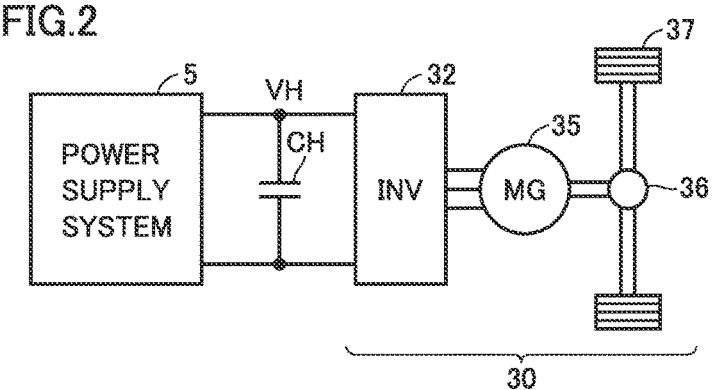
FIG. 2 is a schematic diagram showing a configuration example of a load shown in FIG. 1.

FIG. 2 is a schematic diagram showing a configuration example of load 30.

Referring to FIG. 2, load 30 is configured to include, for example, a motor for running of an electrically powered vehicle. Load 30 includes a smoothing capacitor CH, an inverter 32, a motor generator 35, a power train 36, and a drive wheel 37.

Motor generator 35 is a motor for running, for generating vehicle driving force, and it is implemented, for example by a multiple-phase permanent magnet type synchronous motor. Output torque from motor generator 35 is transmitted to drive wheel 37 through power train 36 constituted of a reduction gear and a power split device. The electrically powered vehicle runs with torque transmitted to drive wheel 37. Motor generator 35 generates power with rotational force from drive wheel 37 during regenerative braking of the electrically powered vehicle. This generated electric power is subjected to AC/DC conversion by inverter 32. This DC power can be used as charging power for DC power supplies B1 and B2 included in power supply system 5.

In a hybrid car on which an engine (not shown) is mounted in addition to the motor generator, this engine and the motor generator 35 are operated in coordination so as to generate vehicle driving force necessary for the electrically powered vehicle. Here, DC power supply (supplies) B1 and/or B2 can also be charged with power generated through rotation of the engine.

Thus, the electrically powered vehicle comprehensively represents a vehicle on which a motor for running is mounted, and includes both of the hybrid car on which an engine and a motor are mounted and an electric car and a fuel cell car on which no engine is mounted.

(Operation of Power Converter)

Similarly to the power converter described in Patent Document 2, power converter 10 has a plurality of operation modes different in manner of DC power conversion (DC/DC conversion) between DC power supplies B1 and B2 and power lines PL and GL. These operation modes are selectively applied by switching a manner of on/off control of the switching elements.

The plurality of operation modes of power converter 10 include a "parallel boost mode" for DC/DC conversion in parallel between DC power supplies B1 and B2 and power lines PL and GL.

As is understood from FIG. 1, power converter 10 has a circuit configuration including a boost chopper circuit formed between DC power supply B1 and power lines PL and GL and a boost chopper circuit formed between DC power supply B2 and power lines PL and GL as being combined. Therefore, an operation of a basic boost chopper circuit will initially be described in detail.

Figure 3:
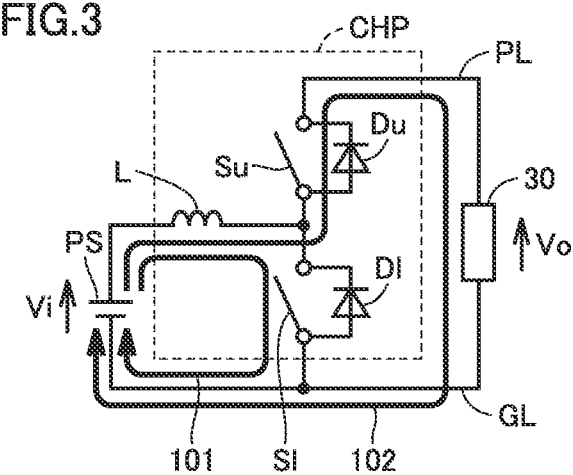
FIG. 3 is a circuit diagram showing a configuration of a basic boost chopper circuit.

FIG. 3 shows a circuit diagram showing a configuration of the basic boost chopper circuit.

Referring to FIG. 3, a boost chopper circuit CHP has a switching element Su implementing an upper arm, a switching element Sl implementing a lower arm, and a reactor L. Reactor L is electrically connected between a point of connection between switching element Su in the upper arm and switching element Sl in the lower arm and a positive electrode terminal of a DC power supply PS. Switching element Su in the upper arm and switching element Sl in the lower arm are connected in series between power lines PL and GL. Diodes Du and Dl are connected in anti-parallel to switching element Su in the upper arm and switching element Sl in the lower arm, respectively.

In boost chopper circuit CHP, an on period and an off period of the lower arm (switching element Sl) are alternately provided. During the on period of the lower arm, a current path 101 through DC power supply PS, reactor L, and lower arm element Sl (on) is formed. Thus, energy is stored in reactor L.

During the off period of the lower arm, a current path 102 through DC power supply PS, reactor L, diode Du (or switching element Su), and load 30 is formed. Thus, energy stored in reactor L during the on period of lower arm element Sl and energy from DC power supply PS are supplied to load 30. Thus, an output voltage to load 30 is boosted as compared with an output voltage from DC power supply PS.

Switching element Su in the upper arm should be turned off during the on period of switching element Sl in the lower arm. During the off period of switching element Sl in the lower arm, switching element Su in the upper arm is turned on, so that power from load 30 can be regenerated to DC power supply PS. For example, by periodically and complementarily turning on and off switching element Su in the upper arm and switching element Sl in the lower arm, DC/DC conversion can be carried out for both of regeneration and power running while controlling output voltage VH, without switching a manner of switching control (on/off control) in accordance with a direction of a current.

When power regeneration to DC power supply PS is not carried out, a direction of a current is limited to one direction. Therefore, it is not necessary to arrange switching element Su in the upper arm, and the upper arm can be implemented only by diode Du. In addition, it is not necessary to arrange diode Dl in the lower arm.

Figure 4:
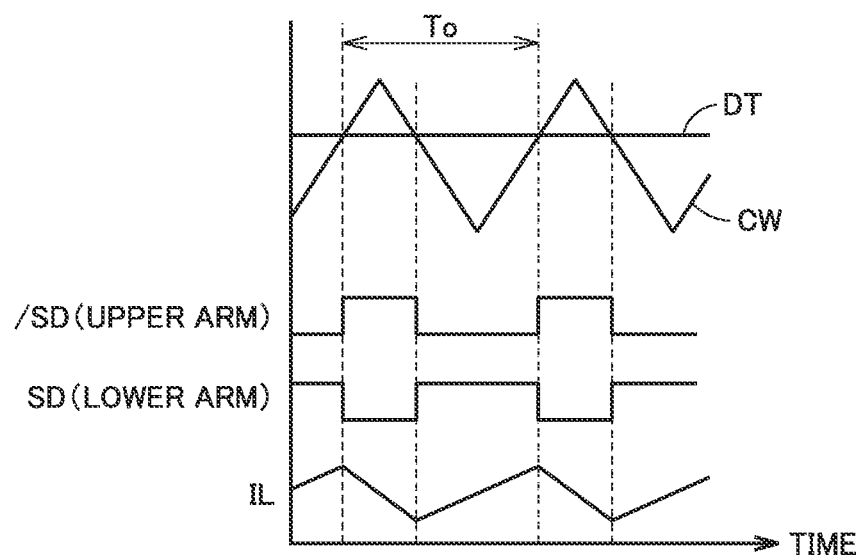
FIG. 4 is an operation waveform diagram of the boost chopper circuit shown in FIG. 3.

FIG. 4 shows an operation waveform example of the boost chopper circuit shown in FIG. 3.

Referring to FIG. 4, during the on period of the lower arm, a current which flows through reactor L (hereinafter referred to as a "reactor current") IL becomes higher and during the off period of the lower arm, reactor current IL is lowered. Therefore, by controlling a ratio between the on period and the off period of switching element Sl in the lower arm, output voltage VH can be controlled. Specifically, by raising a ratio of the on period, output voltage VH becomes higher.

A voltage conversion ratio (a boost ratio) in boost chopper circuit CHP has been known to be expressed by the Expression (1) below, by using a voltage Vi from DC power supply PS, output voltage VH, and an output duty ratio DT (hereinafter also simply referred to as a duty ratio DT). Duty ratio DT is a parameter which represents a ratio of the on period and is defined by a ratio of the on period of the lower arm (a time ratio) to a switching period To (the on period+the off period).

$$VH = 1/(1-DT) \cdot Vi \quad (1)$$

In boost chopper circuit CHP, on and off of the switching element (hereinafter switching control) can be controlled based on pulse width modulation (PWM) control. For example, a control pulse signal SD for turning on and off the lower arm is generated in accordance with voltage comparison between a carrier wave CW and duty ratio DT.

Carrier wave CW is equal in period to switching period To. For example, a triangular wave is employed for carrier wave CW. A frequency of carrier wave CW corresponds to a switching frequency of switching element Sl (Su). A voltage width (peak to peak) of carrier wave CW is set to a voltage corresponding to DT=1.0.

Control pulse signal SD is set to the H level when a voltage exhibiting duty ratio DT is higher than a voltage of carrier wave CW, and set to the L level when it is lower than a voltage of carrier wave CW. A control pulse signal /SD is an inverted signal of control pulse signal SD.

On and off of switching element Sl in the lower arm is controlled in response to control pulse signal SD. Namely, switching element Sl in the lower arm is controlled to on during the H level period of control pulse signal SD, while it is controlled to off during the L level period of control pulse signal SD. On and off of switching element Su in the upper arm can be controlled periodically and complementarily to switching element Sl in the lower arm, in response to control pulse signal /SD.

As duty ratio DT is higher, the H level period of control pulse signal SD is longer and hence the on period of the lower arm is longer. Thus, with increase in output from DC power supply PS with increase in average value of current IL, output voltage VH increases. In contrast, as duty ratio DT is lower, the L level period of control pulse signal SD is longer and hence the on period of the lower arm is shorter. Thus, with lowering in output from DC power supply PS with lowering in average value of current IL, output voltage VH lowers.

(Circuit Operation in Parallel Boost Mode)

An operation and control in the parallel boost mode of power converter 10 will now be described in detail. Power converter 10 operates in such a manner that two boost chopper circuits are operated in the parallel boost mode in parallel with respect to each of DC power supplies B1 and B2. Namely, power converter 10 controls output voltage VH in accordance with voltage command value VH* by carrying out DC/DC conversion in parallel between DC power supplies B1 and B2 and power lines PL and GL (load 30), as in the parallel connection mode in Patent Document 2.

Referring again to FIG. 1, power converter 10 is characterized by difference in boost chopper circuit formed for DC power supplies B1 and B2 between a case where switching element S5 is turned on and a case where it is turned off.

In power converter 10, while switching element S5 is off, nodes N1 and N2 are electrically disconnected from each other. An equivalent circuit of power converter 10 here is shown in FIG. 5.

Figure 5:
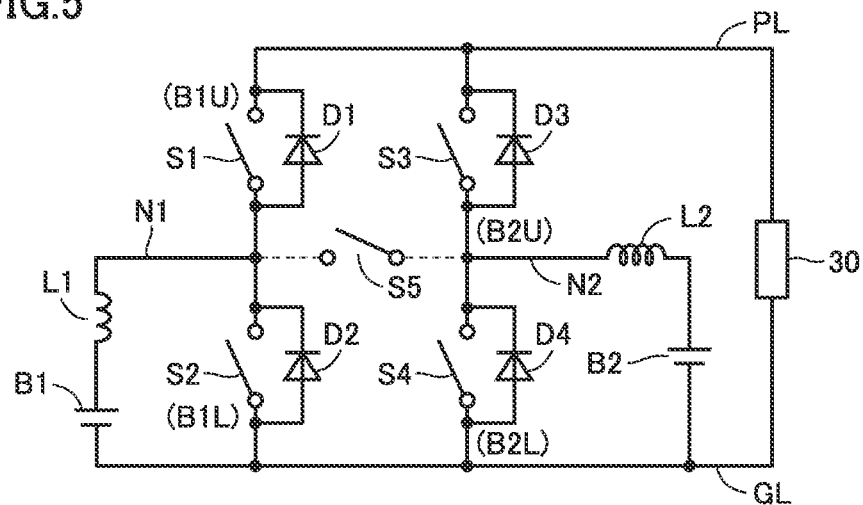
FIG. 5 is a first equivalent circuit diagram in a parallel boost mode of a power converter shown in FIG. 1.

Referring to FIG. 5, while switching element S5 is off, for DC power supply B1, such a boost chopper circuit that switching element S2 and diode D2 implement the lower arm and switching element S1 and diode D1 implement the upper arm is formed.

On the other hand, for DC power supply B2, such a boost chopper circuit that switching element S4 and diode D4 implement the lower arm and switching element S3 and diode D3 implement the upper arm is formed.

Figure 6:
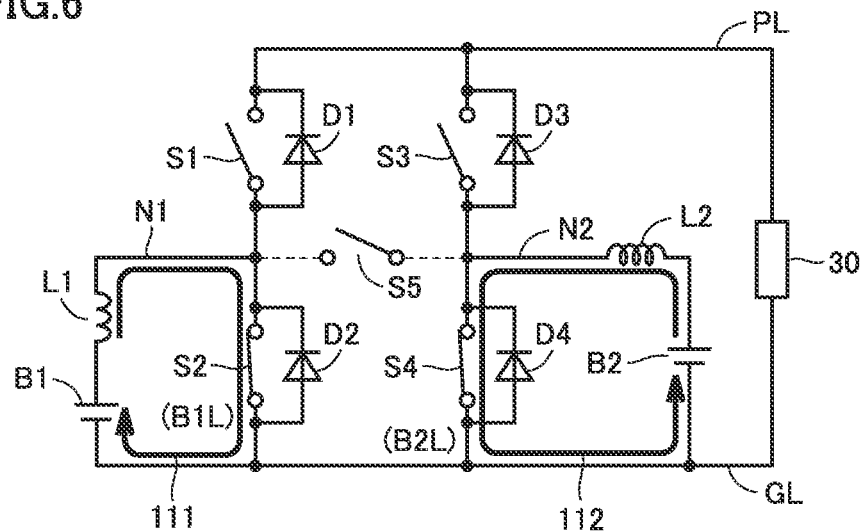

FIG. 6 shows a current path when lower arms of DC power supplies B1 and B2 in the equivalent circuit diagram shown in FIG. 5 are turned on.

Referring to FIG. 6, by turning on switching element S2, similarly to current path 101 in FIG. 3, a current path 111 for storing energy in reactor L1 with output from DC power supply B1 is formed. Namely, switching element S2 corresponds to the lower arm of the boost chopper circuit formed in correspondence with DC power supply B1.

Similarly, by turning on switching element S4, similarly to current path 101 in FIG. 3, a current path 112 for storing energy in reactor L2 with output from DC power supply B2 is formed. Namely, switching element S4 corresponds to the lower arm of the boost chopper circuit formed in correspondence with DC power supply B2.

Figure 7:
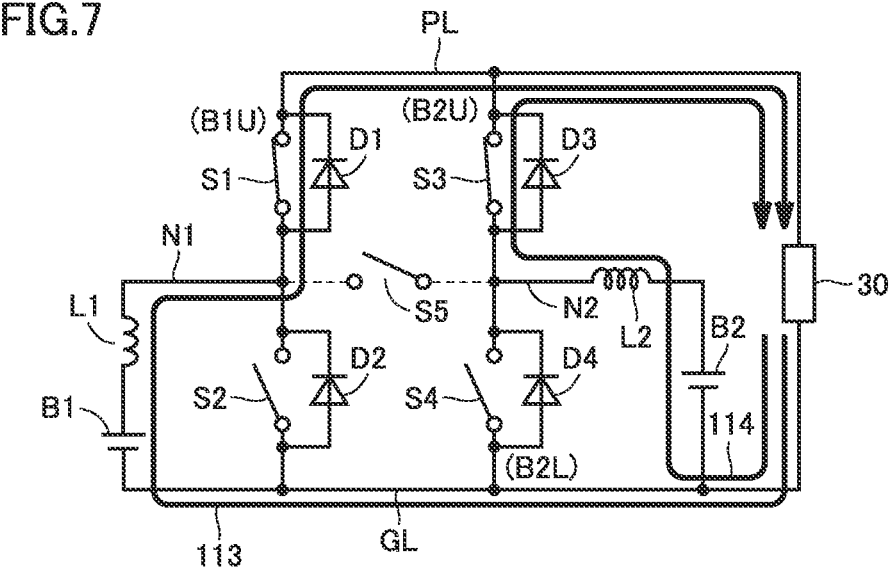

FIG. 7 shows a current path when upper arms of DC power supplies B1 and B2 in the equivalent circuit diagram shown in FIG. 5 are turned on.

Referring to FIG. 7, by turning off switching element S2, a current path 113 for outputting energy stored in reactor L1 to power line PL together with energy from DC power supply B1 through switching element S1 or diode D1 is formed. In the present embodiment, by complementarily turning on and off switching elements S1 and S2, switching element S1 is turned on during the off period of switching element S2. Switching element S1 corresponds to the upper arm of the boost chopper circuit formed in correspondence with DC power supply B1.

Similarly, by turning off switching element S4, a current path 114 for outputting energy stored in reactor L2 to power line PL together with energy from DC power supply B2 through switching element S3 or diode D3 is formed. In the present embodiment, since switching elements S3 and S4 are complementarily turned on and off, switching element S3 is turned on during the off period of switching element S4. Switching element S3 corresponds to the upper arm of the boost chopper circuit formed in correspondence with DC power supply B2.

As is understood from FIGS. 6 and 7, by alternately forming current paths 111 and 113, DC/DC conversion between DC power supply B1 and power lines PL and GL is carried out. Similarly, by alternately forming current paths 112 and 114, DC/DC conversion between DC power supply B2 and power lines PL and GL is carried out.

In the following, the upper arm of the boost chopper circuit formed in correspondence with DC power supply B1 is also referred to as a "B1U arm" and the lower arm is referred to as a "B1L arm". Similarly, the upper arm of the boost chopper circuit formed in correspondence with DC power supply B2 is also referred to as a "B2U arm" and the lower arm is also referred to as a "B2L arm."

In power converter 10, while switching element S5 is on, nodes N1 and N2 are electrically connected to each other. An equivalent circuit of power converter 10 at this time is shown in FIG. 8.

Figure 8:
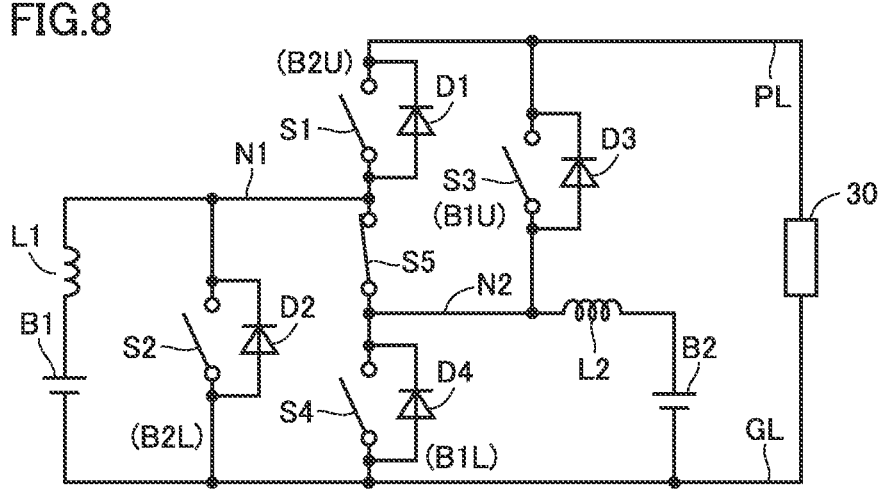
FIG. 8 is a second equivalent circuit diagram in the parallel boost mode of the power converter shown in FIG. 1.

Referring to FIG. 8, in connection with DC power supply B1, switching element S5 allows electrical connection of node N2 to node N1, and hence switching element S4 connected between node N2 and power line GL can serve as the lower arm (the B1L arm) of DC power supply B1 and the boost chopper circuit can thus be formed. Similarly, switching element S3 electrically connected between node N2 and power line PL serves as the upper arm (the B1U arm) of DC power supply B1 and the boost chopper circuit can thus be formed.

For DC power supply B2, the boost chopper circuit can be formed, with switching element S1 connected between node N1 and power line PL serving as the upper arm (the B2U arm) and switching element S2 serving as the lower arm (the B2L arm).

Figure 9A:
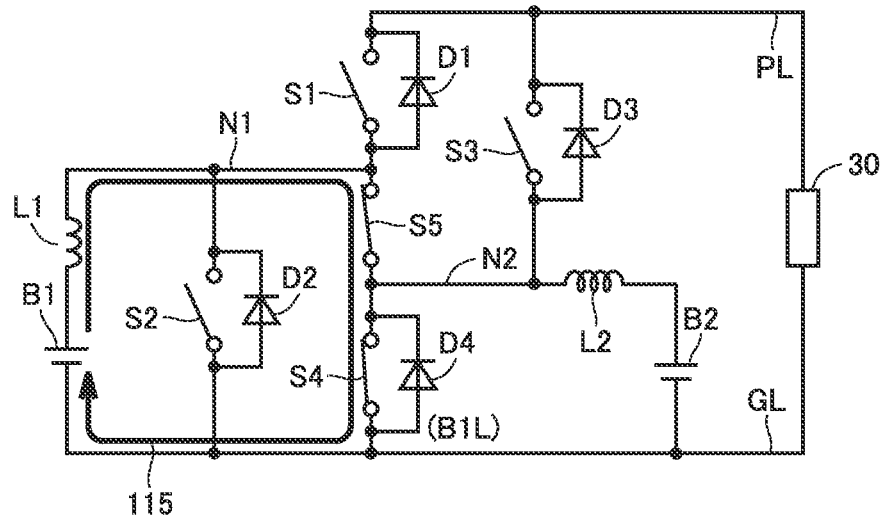
Figure 9B:
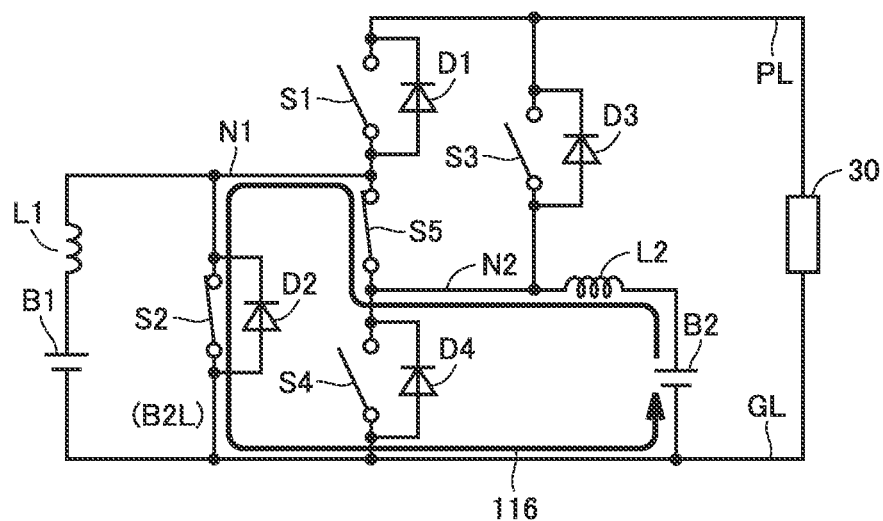

FIGS. 9A and 9B show current paths when the lower arms of DC power supplies B1 and B2 in the equivalent circuit diagram shown in FIG. 8 are turned on.

Referring to FIG. 9A, by turning on switching elements S4 and S5, a current path 115 for storing energy in reactor L1 with output from DC power supply B1 is formed. As shown in FIG. 9B, by turning on switching elements S2 and S5, a current path 116 for storing energy in reactor L2 with output from DC power supply B2 is formed.

FIGS. 10A and 10B show current paths when the upper arms of DC power supplies B1 and B2 in the equivalent circuit diagram shown in FIG. 8 are turned on.

Referring to FIG. 10A, in connection with DC power supply B1, by turning off switching element S4 while switching element S5 is on, a current path 117 for outputting energy stored in reactor L1 to power line PL together with energy from DC power supply B1 through switching element S3 or diode D3 is formed. As described above, since switching elements S3 and S4 are complementarily turned on and off, switching element S3 can form the B1U arm and switching element S4 can form the B1L arm.

Referring to FIG. 10B, in connection with DC power supply B2, by turning off switching element S2 while switching element S5 is on, a current path 118 for outputting energy stored in reactor L2 to power line PL together with energy from DC power supply B2 through switching element S1 or diode D1 is formed. As described above, since switching elements S1 and S2 are complementarily turned on and off, switching element S1 can form the B2U arm and switching element S2 can form the B2L arm.

FIG. 11 shows correspondence between each arm of the boost chopper circuit formed in each case of off and on of switching element S5 and on and off of the switching elements.

Referring to FIG. 11, each arm in the boost chopper circuit formed while switching element S5 is off (FIGS. 5 to 7) is referred to as a "first arm" and each arm of the boost chopper circuit formed while switching element S5 is on (FIGS. 8 to 10) is referred to as a "second arm."

While switching element S5 is off, that is, while the first arm is formed, for DC power supply B1, as described above, the B1L arm is turned on by turning on switching element S2 and the B1U arm is turned on by turning on switching element S1 (turning off of switching element S2). For DC power supply B2, the B2L arm is turned on by turning on switching element S4, and the B2U arm is turned on by turning on switching element S3 (turning off of switching element S4).

While switching element S5 is on, that is, while the second arm is formed, for DC power supply B1, as described above, the B1L arm is turned on by turning on switching element S4, and the B1U arm is turned on by turning on switching element S3 (turning off of switching element S4). For DC power supply B2, the B2L arm is turned on by turning on switching element S2, and the B2U arm is turned on by turning on switching element S1 (turning off of switching element S2).

Thus, in any of the first arm and the second arm, switching elements S1 and S2 are complementarily turned on and off and switching elements S3 and S4 are complementarily turned on and off, so that each of DC power supplies B1 and B2 can be controlled such that the upper arm and the lower arm are alternately turned on and off.

In the parallel boost mode of power converter 10 according to the first embodiment, DC/DC conversion is carried out by using both of the first arm and the second arm. As shown in FIG. 11, however, switching elements S1 to S5 operate as the first arm for one of DC power supplies B1 and B2, while they operate as the second arm for the other of DC power supplies B1 and B2. Attention should be paid to such a fact that interference between the first arm and the second arm will limit a period during which the second arm can be applied.

Specifically, when the second arm is turned on for one of DC power supplies B1 and B2, the second arm is turned on also for the other of DC power supplies B1 and B2. For example, when switching elements S4 and S5 are turned on to thereby turn on the B1L arm of the second arm (FIG. 9A), in response to on of switching element S4, as in FIG. 6, the B2L arm of the first arm is turned on for DC power supply B2. In contrast, when switching elements S3 and S5 are turned on to thereby turn on the B1U arm of the second arm (FIG. 10A), as in FIG. 7, the B2U arm of the first arm is turned on for DC power supply B2.

As is understood also from FIGS. 9A and 10B, when both of the B1L arm and the B2U arm are turned on while the second arm is formed, a short-circuiting path is formed between power lines PL and GL as a result of formation of a current path from node N2 toward node N1 through switching elements S1, S5, and S4 in the on state. Therefore, when both of the B1L arm and the B2U arm are turned on as described above, the first arm (FIG. 6) should be applied by turning off switching element S5.

Similarly, as is understood also from FIGS. 9B and 10A, when both of the B2L arm and the B1U arm are turned on while the second arm is formed, a short-circuiting path is formed between power lines PL and GL as a result of formation of a current path from node N1 toward node N2 through switching elements S3, S5, and S2 in the on state. Therefore, when both of the B1U arm and the B2L arm are turned on as described above, the first arm (FIG. 6) should be applied by turning off switching element S5.

Therefore, a period during which the second arm can be used is limited to a period in which a command (on/off) to the upper arm and a command (on/off) to the lower arm are the same between DC power supplies B1 and B2. Namely, the second arm can be used only during a period in which on of the upper arm is indicated to both of DC power supplies B1 and B2 or during a period in which on of the lower arm is indicated to both of DC power supplies B1 and B2.

FIG. 12 shows gate Boolean expressions for controlling on and off of each of switching elements S1 to S5 in the parallel boost mode.

Referring to FIG. 12, a control pulse signal SD1 corresponds to control pulse signal SD (FIG. 4) in the boost chopper circuit corresponding to DC power supply B1. Namely, while control pulse signal SD1 is at the H level, on of the lower arm is instructed to DC power supply B1. A control pulse signal /SD1 is an inverted signal of control pulse signal SD1. Namely, while control pulse signal /SD1 is at the H level, on of the upper arm is instructed to DC power supply B1.

As the H level period of control pulse signal SD1 is longer, output from DC power supply B1 increases. As the H level period of control pulse signal /SD1 (that is, the L level period of control pulse signal SD1) is longer, output from DC power supply B1 decreases.

Similarly, a control pulse signal SD2 corresponds to control pulse signal SD (FIG. 4) in the boost chopper circuit corresponding to DC power supply B2, and a control pulse signal /SD2 is an inverted signal of control pulse signal SD2. Namely, while control pulse signal SD2 is at the H level, on of the lower arm of DC power supply B2 is instructed, and while control pulse signal /SD2 is at the H level, on of the upper arm of DC power supply B2 is instructed.

As the H level period of control pulse signal SD2 is longer, output from DC power supply B2 increases, and as the H level period of control pulse signal /SD2 (that is, the L level period of control pulse signal SD2) is longer, output from DC power supply B2 decreases.

In the parallel boost mode of power converter 10, on and off of switching element S2 is controlled in correspondence with control pulse signal SD1, and switching element S1 is turned on and off in response to control pulse signal /SD1. On and off of switching element S4 is controlled in response to control pulse signal SD2, and switching element S3 is turned on and off in response to control pulse signal /SD2. On and off of switching element S5 is controlled in accordance with an exclusive NOR (XNOR) of control pulse signals SD1 and SD2.

When control pulse signals SD1 and SD2 are equal in logical level to each other (that is, SD1=SD2=H or SD1=SD2=L), switching element S5 is turned on. Namely, when states of on and off of switching elements S2 and S4 are the same, switching element S5 is turned on. Here, the boost chopper circuit including the second arm is implemented for each of DC power supplies B1 and B2.

When the second arm is used, the logical levels of control pulse signals SD1 and SD2 are equal to each other, and hence it is understood that switching elements S2 and S4 are commonly turned on and off. Switching elements S1 and S3 are also commonly turned on and off. A pair of switching elements S1 and S3 and a pair of switching elements S2 and S4 are turned on and off complementarily. Therefore, complementary on and off of switching elements S1 and S2 and complementary on and off of switching elements S3 and S4 are ensured.

On the other hand, when control pulse signals SD1 and SD2 are different in logical level from each other (that is, SD1=H, SD2=L, or SD1=L, SD2=H), switching element S5 is turned off. Namely, when states of on and off of switching elements S2 and S4 are different from each other, switching element S5 is turned off. Here, the boost chopper circuit including the first arm is implemented for each of DC power supplies B1 and B2.

Therefore, when the first arm is used, switching elements S2 and S3 are commonly turned on and off and switching elements S1 and S4 are commonly turned on and off because control pulse signals SD1 and SD2 are different from each other in logical level. Then, the pair of switching elements S1 and S3 and the pair of switching elements S2 and S4 are turned on and off complementarily. Therefore, when the second arm is used as well, complementary on and off of switching elements S1 and S2 and complementary on and off of switching elements S3 and S4 are ensured.

Thus, by controlling on and off of switching elements S1 to S5 in response to control pulse signals SD1 and SD2 in accordance with the gate Boolean expressions shown in FIG. 12, DC/DC conversion in the parallel boost mode can be carried out while automatic selection between the boost chopper circuit including the first arm and the boost chopper circuit using formation of the second arm is made. In particular, by controlling formation/cut-off of a current path between nodes N1 and N2 through switching element S5, switching between the first arm and the second arm can be made while formation of a short-circuiting path between power lines PL and GL is avoided.

Figure 13:
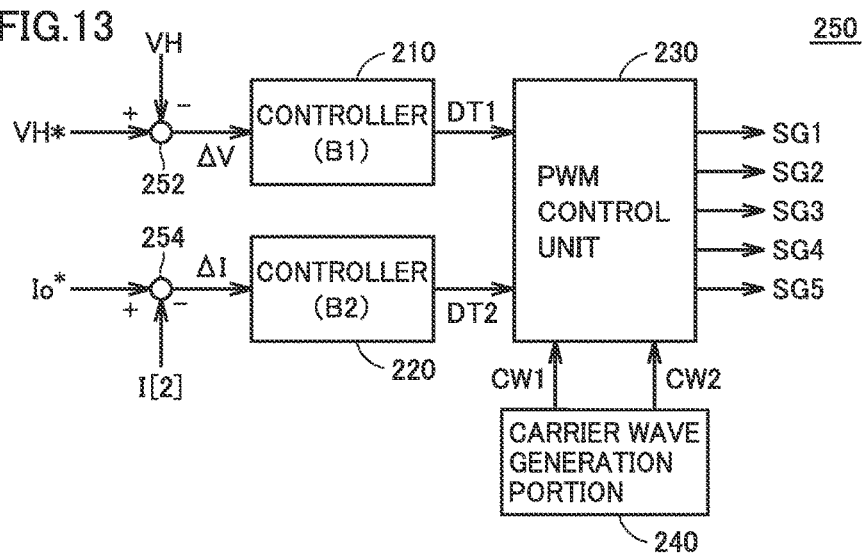
FIG. 13 is a functional block diagram for illustrating an example of control of outputs from the DC power supplies in the parallel boost mode of the power converter shown in FIG. 1.

FIG. 13 is a functional block diagram for illustrating an example of control of outputs from DC power supplies B1 and B2 in the parallel boost mode of power converter 10. In the following, a function of the functional block in each functional block diagram represented by FIG. 13 is implemented by software processing and/or hardware processing by control device 100.

Referring to FIG. 13, in the parallel boost mode, as in the parallel connection mode in Patent Document 2, output from one of DC power supplies B1 and B2 can be controlled so as to compensate for a voltage difference ΔV (ΔV=VH*−VH) in output voltage VH (voltage control), and output from the other of DC power supplies B1 and B2 can be controlled so as to compensate for a current difference of current I[1] or I[2] (current control). For example, a command value (Io*) for current control can be set in order to control output power from the power supply.

By way of example, a converter control unit 250 in the parallel boost mode controls power converter 10 so as to subject output from DC power supply B1 to voltage control and subject output from DC power supply B2 to current control. In this case, by using a power command value P[2]* and voltage V[2] of DC power supply B2 so as to set Io*=P[2]*/V[2], an input/output voltage of DC power supply B2 can be controlled in accordance with power command value P[2]*.

Converter control unit 250 includes subtraction portions 252 and 254, a controller 210 for controlling output from DC power supply B1, a controller 220 for controlling output from DC power supply B2, a PWM control unit 230, and a carrier wave generation portion 240.

Subtraction portion 252 calculates voltage difference ΔV (ΔV=VH*−VH) for voltage control. Controller 210 operates an output duty ratio DT1 of DC power supply B1 (hereinafter simply referred to as duty ratio DT1) through feedback control for compensating for voltage difference ΔV (for example, PI control). Duty ratio DT1 can also be operated, with a theoretical boost ratio found from a voltage ratio between output voltage V[1] from DC power supply B1 and voltage command value VH* being further reflected.

Subtraction portion 254 calculates a current difference ΔI (ΔI=Io*−I[2]) for current control. Controller 220 operates an output duty ratio DT2 of DC power supply B2 (hereinafter simply referred to as duty ratio DT2) through feedback control for compensating for current difference ΔI (for example, PI control). Duty ratio DT2 can also be operated, with a theoretical boost ratio found from a voltage ratio between output voltage V[2] from DC power supply B2 and voltage command value VH* being further reflected.

Carrier wave generation portion 240 generates a carrier wave CW1 used for control of DC power supply B1 and CW2 used for control of DC power supply B2. PWM control unit 230 generates control signals SG1 to SG5 based on combination between PWM control based on comparison between duty ratio DT1 and carrier wave CW1 and PWM control based on comparison between carrier wave CW2 and duty ratio DT2. Carrier waves CW1 and CW2 have the same frequency corresponding to a switching frequency.

Figure 14:
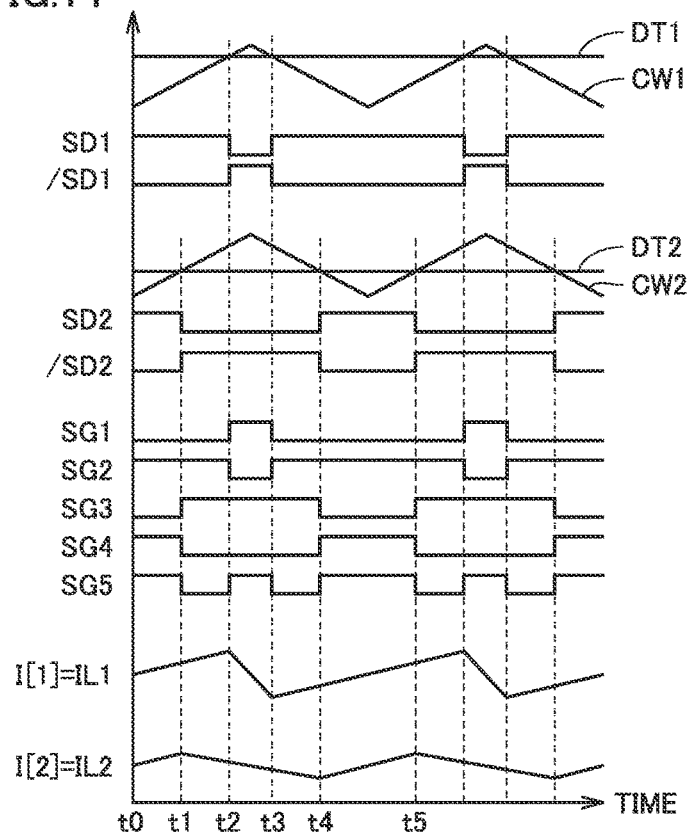
FIG. 14 is a waveform diagram for illustrating an operation of a PWM control unit shown in FIG. 13.

FIG. 14 shows a waveform diagram for illustrating an operation of PWM control unit 230 in the parallel connection mode.

Referring to FIG. 14, for DC power supply B1, control pulse signals SD1 and /SD1 are generated through PWM control based on voltage comparison between carrier wave CW1 and duty ratio DT1. During a period in which a condition of DT1>CW1 is satisfied, control pulse signal SD1 is set to the H level, and during a period in which a condition of CW1>DT1 is satisfied, control pulse signal SD1 is set to the L level. Therefore, with increase in duty ratio DT1, the H level period of control pulse signal SD1 is longer and the L level period of control pulse signal /SD1 is shorter. As described above, since on of the lower arm of DC power supply B1 is indicated during the H level period of control pulse signal SD1, output from DC power supply B1 increases with increase in duty ratio DT1, while output from DC power supply B1 decreases with lowering in duty ratio DT1.

Similarly, for DC power supply B2 as well, control pulse signals SD2 and /SD2 are generated through PWM control based on voltage comparison between duty ratio DT2 and carrier wave CW2. Similarly to control pulse signals SD1 and /SD1, during a period in which a condition of DT2>CW2 is satisfied, control pulse signal SD2 is set to the H level, and during a period in which a condition of CW2>DT2 is satisfied, control pulse signal SD2 is set to the L level. During the H level period of control pulse signal SD2, on of the lower arm of DC power supply B2 is indicated, and hence output from DC power supply B2 increases with increase in duty ratio DT2 while output from DC power supply B2 decreases with lowering in duty ratio DT2.

Control signals SG1 to SG5 are generated in response to control pulse signals SD1, /SD1, SD2, and /SD2 obtained through PWM control, in accordance with the Boolean expressions shown in FIG. 12. Here, in accordance with the Boolean expressions shown in FIG. 12, a switching pattern of switching elements S1 to S5 is limited to four shown in FIG. 15, depending on combination between the H/L level of control pulse signal SD1 and the H/L level of control pulse signal SD2.

Figures 15, 16:
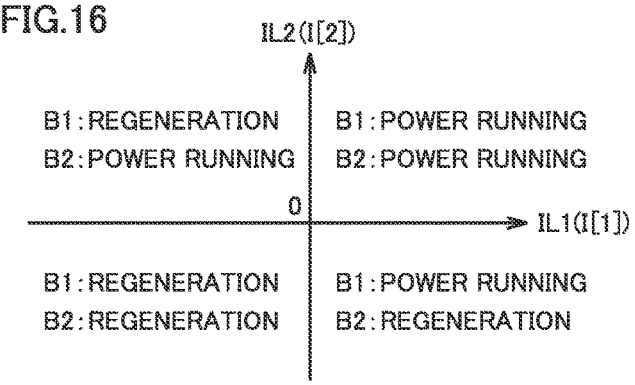
FIG. 15 is a chart showing a list of switching patterns in the parallel boost mode.
FIG. 16 is a conceptual diagram illustrating combination of orientations of reactor currents in the power converter according to the first embodiment.

FIG. 15 is a chart showing a list of on/off patterns (switching patterns) of switching elements S1 to S5 in the parallel boost mode.

Referring to FIG. 15, during a period from time t0 to t1, a condition of SD1=SD2=H is satisfied. Here, as shown in FIG. 15, a condition of control signal SG1=SG3=L is satisfied, while a condition of SG2=SG4=SG5=H is satisfied. Therefore, under such a condition that switching element S5 is turned on and the boost chopper circuit including the second arm is formed, switching elements S1 and S3 are turned off while switching elements S2 and S4 are turned on.

Here, as is understood from FIG. 11, the B1L arm and the B2L arm of the second arm are turned on. Namely, on of the lower arm is indicated to each of DC power supplies B1 and B2. Therefore, during the period from time t0 to t1, both of reactor currents IL1 and IL2 increase. As is clear from the circuit configuration in FIG. 1, reactor current IL1 corresponds to current I[1] from DC power supply B1, and reactor current IL2 corresponds to current I[2] from DC power supply B2.

Referring again to FIG. 14, since control pulse signal SD2 changes from the H level to the L level at time t1, during a period from time t1 to t2, a condition of SD1=H and SD2=L is satisfied. Here, as shown in FIG. 15, a condition of control signal SG2=SG3=H is satisfied, while a condition of SG1=SG4=SG5=L is satisfied. Therefore, under such a condition that switching element S5 is turned off and the boost chopper circuit including the first arm is formed, switching elements S2 and S3 are turned on while switching elements S1 and S4 are turned off.

Here, as is understood from FIG. 11, the B1L arm and the B2U arm of the first arm are turned on. Namely, on of the lower arm is indicated to DC power supply B1, while on of the upper arm is indicated to DC power supply B2. Therefore, during the period from time t1 to t2, reactor current IL1 increases while reactor current IL2 lowers.

Referring again to FIG. 14, since control pulse signal SD1 changes from the H level to the L level at time t2, during a period from time t2 to t3, a condition of SD1=SD2=L is satisfied. Here, as shown in FIG. 15, a condition of control signal SG2=SG4=L is satisfied, while a condition of SG1=SG3=SG5=H is satisfied. Therefore, under such a condition that switching element S5 is turned on and the boost chopper circuit including the second arm is formed, switching elements S1 and S3 are turned on and switching elements S2 and S4 are turned off.

Here, as is understood from FIG. 11, the B1U arm and the B2U arm of the second arm are turned on. Namely, on of the upper arm is indicated to each of DC power supplies B1 and B2. Therefore, during the period from time t2 to t3, both of reactor currents IL1 and IL2 lower.

Referring again to FIG. 14, since control pulse signal SD1 changes from the L level to the H level at time t3, during a period from time t3 to t4, a condition of SD1=H and SD2=L is satisfied. Therefore, as a switching pattern during the period from time t0 to t1 is reproduced, under such a condition that the first arm is used, switching elements S1 to S5 are controlled such that reactor current IL1 increases while reactor current IL2 lowers.

In the operation example in FIG. 14, since a condition of DT1>DT2 is satisfied, in contrast to the period from time t0 to t1, there is no period during which a condition of SD1=L and SD2=H is satisfied. During that period, however, as shown in FIG. 15, a condition of control signal SG1=SG4=H is satisfied, while a condition of SG2=SG3=SG5=L is satisfied. Therefore, under such a condition that switching element S5 is turned off and the boost chopper circuit including the first arm is formed, switching elements S1 and S4 are turned on while switching elements S2 and S3 are turned off.

Here, as is understood from FIG. 11, the B1U arm and the B2L arm of the first arm are turned on. Namely, on of the lower arm is indicated to DC power supply B2, while on of the upper arm is indicated to DC power supply B1. Therefore, it is understood that, during that period, switching elements S1 to S5 are controlled such that reactor current IL2 increases while reactor current IL1 lowers.

At time t4 or later in FIG. 14 as well, switching elements S1 to S5 can similarly be controlled in accordance with the switching pattern shown in FIG. 15 through PWM control in accordance with duty ratios DT1 and DT2.

Thus, according to power converter 10 in the first embodiment, in the parallel boost mode, on and off of switching elements S1 to S5 is controlled in accordance with duty ratios DT1 and DT2 for control of output from DC power supplies B1 and B2, in accordance with the Boolean expressions shown in FIG. 12. Thus, DC power supplies B1 and B2 can carry out DC/DC conversion in parallel for power lines PL and GL, while switching between a period in which the boost chopper circuit including the first arm is formed and a period in which the boost chopper circuit including the second arm is formed is automatically made.

In particular, power converter 10 can be controlled such that one of DC power supplies B1 and B2 is subjected to voltage control (control of VH to VH*) and the other of DC power supplies B1 and B2 is subjected to current control (control of I[1] or I[2] to Io*) through control of output from DC power supplies B1 and B2 based on duty ratios DT1 and DT2. Thus, in the parallel boost mode, input/output power of the DC power supply subjected to voltage control can also indirectly be controlled by controlling input/output power of the DC power supply subjected to current control, with respect to input/output power PL (load power PL) of power converter 10 as a whole to/from load 30.

Namely, power converter 10 can control power allocation between DC power supplies B1 and B2 and can control output voltage VH to voltage command value VH* in the parallel boost mode, as in the parallel connection mode in the power converter described in Patent Document 2.

Control of outputs from DC power supplies B1 and B2 is not limited to the illustration in FIG. 13, and duty ratios DT1 and DT2 can be calculated in any manner so long as a function to control output voltage VH to voltage command value VH* is achieved.

By way of example of a modification, outputs from DC power supplies B1 and B2 can also be subjected to power control (current control) based on calculation of necessary power Pr input to and output from power converter 10 for controlling output voltage VH to voltage command value VH*. Specifically, electric power output from DC power supplies B1 and B2 can be controlled in accordance with power command values P1* and P2* resulting from allocation of necessary power Pr between DC power supplies B1 and B2 (Pr=P1*+P2*). In the parallel boost mode, allocation between power command values P1* and P2* can freely be set. In this case, in the control configuration in FIG. 13, controllers 210 and 220 can calculate duty ratios DT1 and DT2 through feedback control of currents I[1] and I[2] with current command values I1* (I1*=P1*/V[1]) and I2* (I2*=P2*/V[2]) calculated from power command values P1* and P2* being defined as the reference values.

As described above, power converter 10 can control electric power allocation between DC power supplies B1 and B2 in the parallel boost mode. Consequently, electric power allocation of input/output electric power P1 of DC power supply B1 and input/output electric power P2 of DC power supply B2 with respect to total input/output electric power PL for load 30 can be controlled such that a condition of PL=P1+P2 is satisfied. Therefore, in a power running operation of load 30 (PL>0), load power PL can be supplied by DC power supplies B1 and B2 as a whole when not only a condition of P1>0 and P2>0 is satisfied but also a condition of P1>0 and P2<0 or a condition of P1<0 and P2>0 is satisfied. In contrast, in a regeneration operation of load 30 (PL<0), load power PL can be accepted by DC power supplies B1 and B2 as a whole when not only a condition of P1<0 and P2<0 is satisfied but also a condition of P1<0 and P2>0 or a condition of P1>0 and P2<0 is satisfied. Namely, in the parallel boost mode, power converter 10 can be controlled such that one of DC power supplies B1 and B2 performs the regeneration operation and the other performs the power running operation.

(Power Loss in Power Converter in Parallel Boost Mode)

An effect of reduction in power loss in the parallel boost mode of power converter 10 according to the first embodiment will now be described in detail.

Power converter 10 is equivalent to the circuit configuration in which two boost chopper circuits are connected in parallel as shown in FIG. 5, that is, the power supply system in Patent Document 1, when switching element S5 is off, that is, when the boost chopper circuit including the first arm is formed. It is understood that a power loss in switching elements S1 to S5 here is comparable to that in the power converter in Patent Document 1.

On the other hand, in the parallel connection mode of the power converter shown in Patent Document 2, it is concerned that a conduction loss increases due to flows of currents resulting from DC/DC conversion for two DC power supplies as being superimposed on each other through some switching elements. Namely, there is a concern that a power loss in the switching element is greater than in the power converter in Patent Document 1 in the parallel connection mode of the power converter in Patent Document 2.

In contrast, in power converter 10 according to the first embodiment, as will be described below, a conduction loss in the switching element can be reduced by providing a period in which the second arm described above is formed.

Referring again to FIG. 15, when switching element S5 is turned on in power converter 10, that is, during a period in which the boost chopper circuit including the second arm is formed, there are only two patterns of a first pattern in which switching elements S2, S4, and S5 are turned on (S1 and S3 are turned off) and a second pattern in which switching elements S1, S3, and S5 are turned on (S2 and S4 are turned off). As described above, in the first pattern, the lower arm is turned on in both of DC power supplies B1 and B2, and in the second pattern, the upper arm is turned on in both of DC power supplies B1 and B2.

As is understood from FIG. 8, in the first pattern (S2, S4, and S5 are turned on), switching elements S2 and S4 are electrically connected in parallel between the positive electrode terminal and the negative electrode terminal of DC power supply B1 through switching element S5, as the lower arm of DC power supply B1. Simultaneously, switching elements S2 and S4 are electrically connected in parallel between the positive electrode terminal and the negative electrode terminal of DC power supply B2 through switching element S5, as the lower arm of DC power supply B2.

In the second pattern (S1, S3, and S5 are turned on), switching elements S1 and S3 are electrically connected in parallel between node N2 and power line PL through switching element S5, as the upper arm of DC power supply B2. Simultaneously, switching elements S1 and S3 are electrically connected in parallel between node N1 and power line PL through switching element S5, as the upper arm of DC power supply B1.

When the second arm is formed, a power loss in the switching element is suppressed by a current division effect as a result of connection in parallel of a plurality of switching elements as the upper arm or the lower arm of DC power supplies B1 and B2 and a current cancellation effect by reactor currents IL1 and IL2. The effect of mutual current cancellation is a difference in behavior, depending on orientations (positive/negative) of reactor currents IL1 and IL2.

FIG. 16 shows a conceptual diagram illustrating combination of directions of reactor currents IL1 and IL2 in power converter 10.

Referring to FIG. 16, based on combination of positive/negative of reactor currents IL1 and IL2, an operation region of power converter 10 is divided into a region where both of DC power supplies B1 and B2 perform a power running operation (IL1>0, IL2>0), a region where DC power supply B1 performs a regeneration operation while DC power supply B2 performs a power running operation (IL1<0, IL2>0), a region where both of DC power supplies B1 and B2 perform a regeneration operation (IL1<0, IL2<0), and a region where DC power supply B1 performs a power running operation while DC power supply B2 performs a regeneration operation (IL1>0, IL2<0).

Figure 17A:
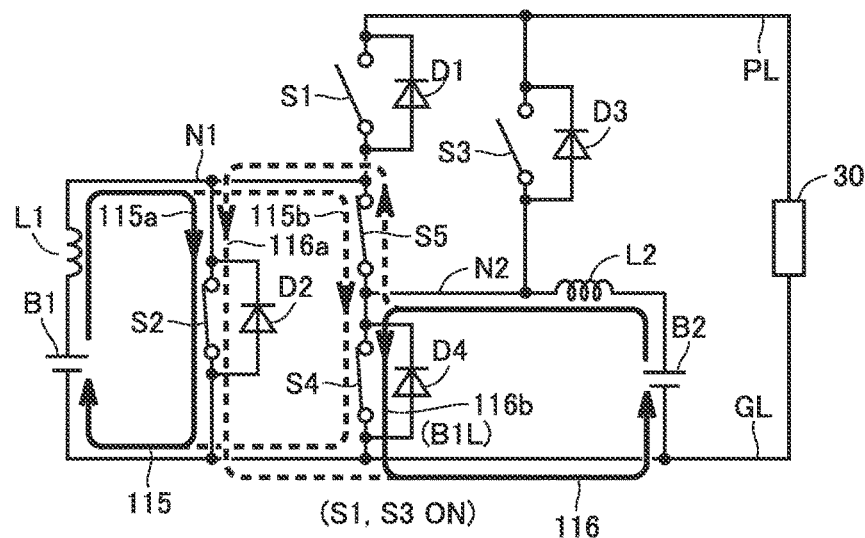
FIGS. 17A and 17B are first and second circuit diagrams illustrating a current behavior in a first pattern when a second arm is formed.
Figure 17B:
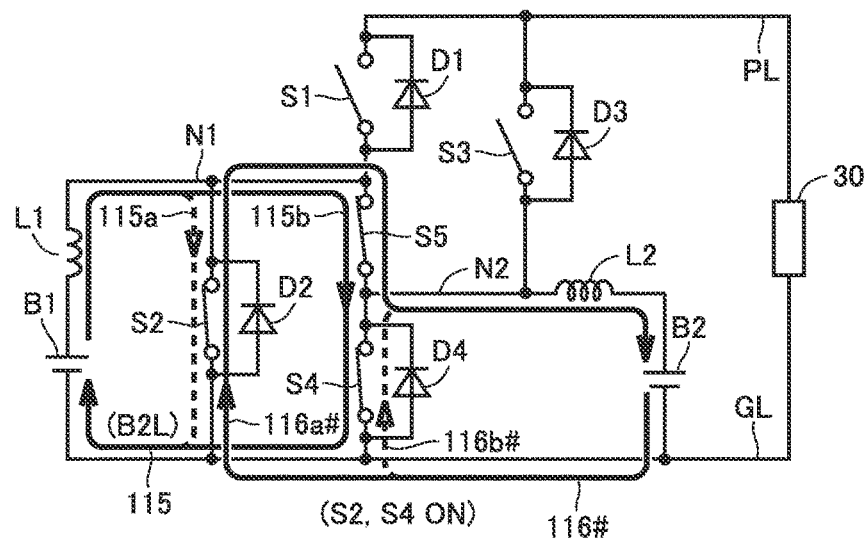
Figure 18A:
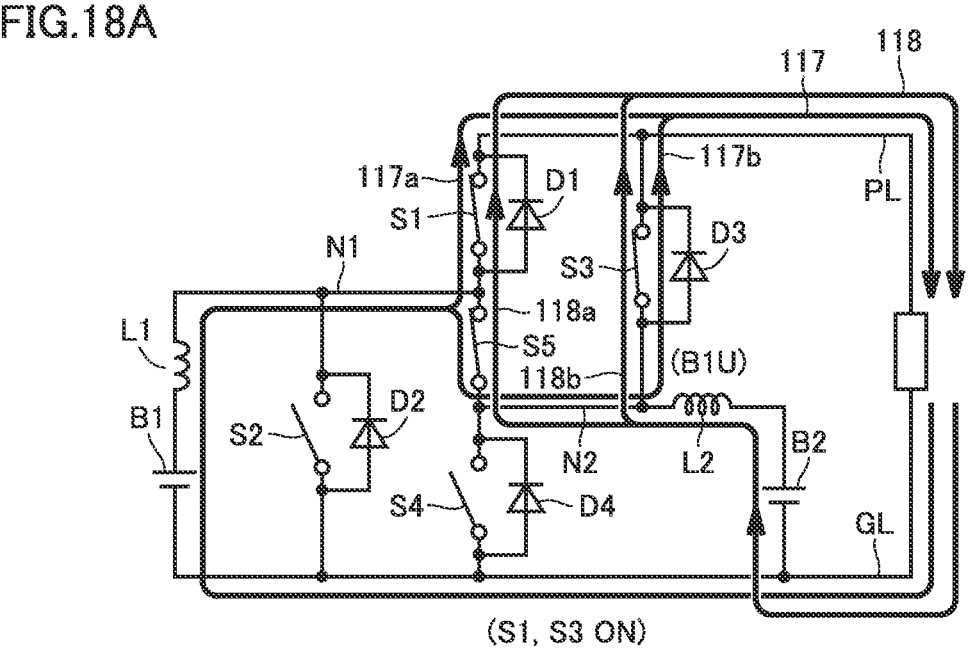
FIGS. 18A and 18B are first and second circuit diagrams illustrating a current behavior in a second pattern when the second arm is formed.
Figure 18B:
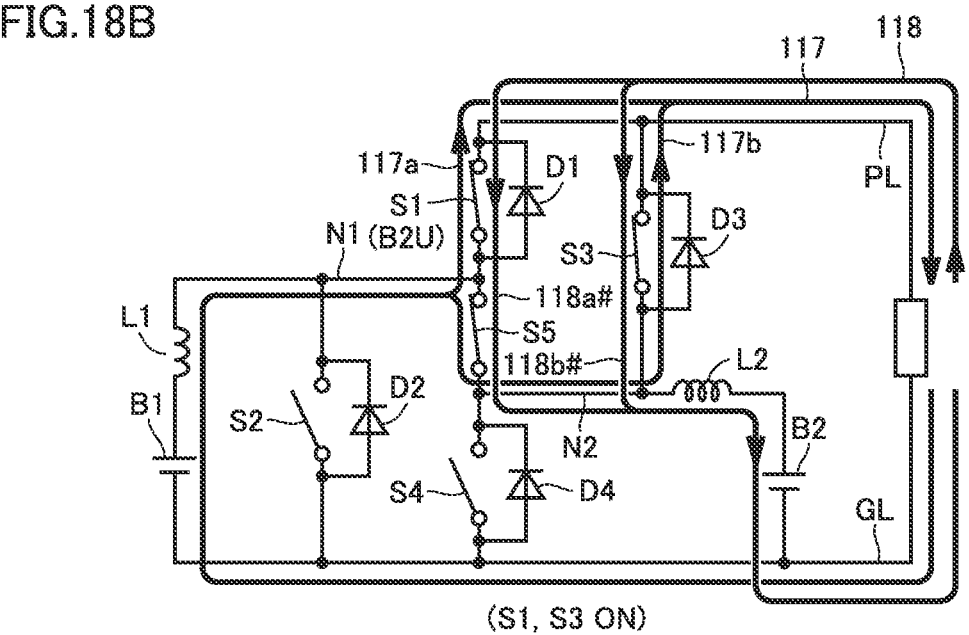

A behavior of a current while the second arm is formed will be described with reference to FIGS. 17A and 17B and FIGS. 18A and 18B. FIGS. 17A and 17B show a behavior of a current in the first pattern (the lower arm is on in both of B1 and B2). FIGS. 18A and 18B show a behavior of a current in the second pattern (the upper arm is on in both of B1 and B2).

FIG. 17A shows a behavior of a current at the time when a condition of IL1>0 and IL2>0 is satisfied in which both of DC power supplies B1 and B2 perform the power running operation. In the first pattern, switching elements S2, S4, and S5 in the on state are connected in a form of a loop between nodes N1 and N2 and power line GL. In this state, since switching elements S2, S4, and S5 are in such a state that diodes are bidirectionally connected in parallel, paths for reactor currents IL1 and IL2 are varied in accordance with relation of a potential of nodes N1 and N2.

Here, a forward voltage substantially the same in magnitude is generated in each of conducting diodes through which currents flow. Therefore, such a state that a current flows through all of switching elements S2, S4, and S5 connected in a form of a loop (a conducting state) does not take place, because, if three substantially comparable voltages form a closed path in a loop, the Kirchhoff's voltage law does not hold whichever orientation each voltage may be in. Therefore, any of switching elements S2, S4, and S5 is naturally non-conducting, and a current does not pass therethrough.

As shown in FIG. 17A, when a condition of IL1>0 and IL2>0 is satisfied, IL1 and IL2 flow to nodes N1 and N2. With this direction of currents, switching element S5 is not conducting and switching elements S2 and S4 are conducting. This is because, if it is assumed that switching element S5 is conducting and switching elements S2 and S5 or switching elements S4 and S5 are conducting, remaining switching element S4 or S2 has to be conducting, which is inconsistent with the Kirchhoff's voltage law.

More specifically, with the direction of currents in FIG. 17A, if it is assumed that switching elements S4 and S5 are conducting and switching element S2 is not conducting, the sum of forward voltages through switching elements S4 and S5 is applied to switching element S2 and switching element S2 cannot be non-conducting. Similarly, if it is assumed that switching elements S2 and S5 are conducting and switching element S4 is not conducting, the sum of forward voltages through switching elements S2 and S5 is applied to switching element S4 and hence switching element S4 cannot be non-conducting. Therefore, such a circuit state of conducting switching element S5, which is inconsistent with the Kirchhoff's voltage law, does not occur.

Therefore, though reactor current IL1 can be divided into a current path 115a which goes through switching element S2 and a current path 115b which goes through switching elements S5 and S4 from a point of view of a switching pattern, actually, reactor current IL1 flows only through current path 115a. Similarly, though reactor current IL2 can be divided into a current path 116a which goes through switching elements S5 and S2 and a current path 116b which goes through switching element S4 from a point of view of a switching pattern, actually, reactor current IL2 flows only through current path 116b.

Consequently, a condition of I (S5)=0 is satisfied in switching element S5, whereas a condition of I (S2)=IL1 is satisfied in switching element S2 and a condition of I (S4)=IL2 is satisfied in switching element S4. Therefore, when a condition of IL1>0 and IL2>0 is satisfied, the current division effect and the current cancellation effect are not exhibited and a power loss in the switching element is the same as in the case of formation of the first arm, that is, as in Patent Document 1.

Since the current paths in FIG. 17A are formed as being inverted also when a condition of IL1<0 and IL2<0 is satisfied in which both of DC power supplies B1 and B2 perform the regeneration operation, the current division effect and the current cancellation effect are not exhibited for a current which passes through the switching element. Namely, a power loss in the switching element is the same as in FIG. 17A.

FIG. 17B shows a behavior of a current when orientations (positive/negative) of reactor currents IL1 and IL2 are reverse to each other. By way of example, a case that DC power supply B1 performs the power running operation whereas DC power supply B2 performs the regeneration operation (IL1>0 and IL2<0) is shown. In this case, IL1 flows to node N1 whereas IL2 flows out of node N2.

With this direction of currents, in current paths 115a and 115b to which reactor current IL1 can be divided and current paths 116a# and 116b# to which reactor current IL2 can be divided, reactor currents IL1 and IL2 cancel each other in switching elements S2 and S4.

As described also with reference to FIG. 17A, there is no possibility that all of switching elements S2, S4, and S5 are conducting. Therefore, a current greater in absolute value of reactor currents IL1 and IL2 is divided, whereas a current smaller in absolute value is not divided but passes only through a current path which goes through switching element S5.

When a condition of |IL1|<|IL2| is satisfied, reactor current IL1 is not divided but forms only current path 115b. Reactor current IL2 is divided into current paths 116a# and 116b#. Here, a current IL2a through current path 116a# is naturally adjusted such that a condition of IL2a+IL1=0 is satisfied and switching element S2 is not conducting under the Kirchhoff's voltage law.

FIG. 19 shows current values in each portion in FIG. 17B.

Referring to FIGS. 17B and 19, reactor current IL1 does not flow to current path 115b but entirely flows to current path 115a. In current path 116a#, an amount of reactor current IL2 comparable to −IL1 is produced in order to render switching element S2 non-conducting, whereas a remaining amount of reactor current IL1+IL2 (IL1>0 and IL2<0) flows through current path 116b#.

Consequently, a condition of I (S2)=IL1+(−IL1)=0 is satisfied in switching element S2, I (S4)=IL1+IL2 (IL1>0 and IL2<0) is satisfied in switching element S4, and I (S5)=−IL1 is satisfied in switching element S5.

In contrast, when a condition of |IL1|>|IL2| is satisfied, reactor current IL2 is not divided but forms only current path 116b#. Reactor current IL1 is divided into current paths 115a and 115b. Here, a current IL1b through current path 115b is naturally adjusted such that a condition of IL1b+IL2=0 is satisfied and switching element S4 is not conducting under the Kirchhoff's voltage law.

Therefore, as shown in FIG. 19, reactor current IL2 does not flow to current path 116a# but entirely flows to current path 116b#. In current path 115b, an amount of reactor current IL1 comparable to −IL2 is produced in order to render switching element S4 non-conducting, whereas a remaining amount of reactor current IL1+IL2 (IL1>0 and IL2<0) flows through current path 115a.

Consequently, a condition of I (S4)=IL2+(−IL2)=0 is satisfied in switching element S4, I (S2)=IL1+IL2 (IL1>0 and IL2<0) is satisfied in switching element S2, and I (S5)=−IL2 is satisfied in switching element S5.

In contrast to FIG. 17B, when DC power supply B1 performs the regeneration operation whereas DC power supply B2 performs the power running operation, that is, when a condition of IL1<0 and IL2>0 is satisfied, IL1 flows out of node N1 whereas IL2 flows to node N2. Therefore, since the current path in FIG. 17B is formed as being inverted, the current division effect and the current cancellation effect are exhibited for a current which passes through the switching element. Namely, a power loss in the switching element is the same as in FIG. 17B.

A behavior of a current in the second pattern (the upper arm is on in both of B1 and B2) will now be described with reference to FIGS. 18A and 18B.

FIG. 18A shows a behavior of a current at the time when a condition of IL1>0 and IL2>0 is satisfied in which both of DC power supplies B1 and B2 perform the power running operation as in FIG. 17A. In the second pattern, switching elements S1, S3, and S5 in the on state are connected in a form of a loop between nodes N1 and N2 and power line GL.

Any one of switching elements S1, S3, and S5, however, is non-conducting and a current does not pass therethrough under the Kirchhoff's voltage law. When a condition of IL1>0 and IL2>0 is satisfied, IL1 and IL2 flow to nodes N1 and N2. With this direction of currents, switching element S5 is not conducting and switching elements S1 and S3 are conducting.

With the direction of the currents in FIG. 18A, if it is assumed that switching elements S1 and S5 are conducting and switching element S3 is not conducting, the sum of forward voltages of switching elements S1 and S5 is applied to switching element S3 and hence switching element S3 cannot be non-conducting. Similarly, if it is assumed that switching elements S3 and S5 are conducting and switching element S1 is non-conducting, the sum of forward voltages of switching elements S3 and S5 is applied to switching element S1 and switching element S1 cannot be non-conducting. Consequently, it is understood that such a circuit state that switching element S5 is conducting and switching elements S1 and S5 or switching elements S3 and S5 are conducting does not occur.

Therefore, though reactor current IL1 can be divided into a current path 117a which goes through switching element S1 and a current path 117b which goes through switching elements S5 and S3 from a point of view of a switching pattern, actually, reactor current IL1 flows only through current path 117a. Similarly, though reactor current IL2 can be divided into a current path 118a which goes through switching elements S5 and S1 and a current path 118b which goes through switching element S3 from a point of view of a switching pattern, actually, reactor current IL2 flows only through current path 118b.

Consequently, a condition of I (S5)=0 is satisfied in switching element S5, whereas a condition of I (S1)=IL1 is satisfied in switching element S1 and a condition of I (S3)=IL2 is satisfied in switching element S3. Therefore, when a condition of IL1>0 and IL2>0 is satisfied, the current division effect and the current cancellation effect are not exhibited and a power loss in the switching element is the same as in the case of formation of the first arm, that is, as in Patent Document 1.

Since a current path in FIG. 18A is formed as being inverted also when a condition of IL1<0 and IL2<0 is satisfied in which both of DC power supplies B1 and B2 perform the regeneration operation, the current division effect and the current cancellation effect are not exhibited for a current which passes through the switching element. Namely, a power loss in the switching element is the same as in FIG. 18A.

FIG. 18B shows a behavior of a current when orientations (positive/negative) of reactor currents IL1 and IL2 are reverse to each other. By way of example, a case that DC power supply B1 performs the power running operation whereas DC power supply B2 performs the regeneration operation (IL1>0 and IL2<0) is shown. In this case, IL1 flows to node N1 whereas IL2 flows out of node N2.

With this direction of currents, in current paths 117a and 117b to which reactor current IL1 can be divided and current paths 118a# and 118b# to which reactor current IL2 can be divided, reactor currents IL1 and IL2 cancel each other in switching elements S1 and S3.

As described also with reference to FIG. 18A, there is no possibility that all of switching elements S1, S3, and S5 are conducting. Therefore, a current greater in absolute value of reactor currents IL1 and IL2 is divided, whereas a current smaller in absolute value is not divided but passes only through a current path which goes through switching element S5.

When a condition of |IL1|<|IL2| is satisfied, reactor current IL1 is not divided but forms only current path 117b. Reactor current IL2 is divided into current paths 118a# and 118b#. Here, current IL2a through current path 118a# is naturally adjusted such that a condition of IL2a+IL1=0 is satisfied and switching element S1 is not conducting.

FIG. 20 shows current values in each portion in FIG. 18B.

Referring to FIGS. 18B and 20, reactor current IL1 does not flow to current path 117b but entirely flows to current path 117a. In current path 118a#, an amount of reactor current IL2 comparable to −IL1 is produced in order to render switching element S1 non-conducting, whereas a remaining amount of reactor current IL1+IL2 (IL1>0 and IL2<0) flows through current path 118b#.

Consequently, a condition of I (S1)=IL1+(−IL1)=0 is satisfied in switching element S1, a condition of I (S3)=IL1+IL2 (IL1>0 and IL2<0) is satisfied in switching element S3, and a condition of I (S5)=−IL1 is satisfied in switching element S5.

In contrast, when a condition of |IL1|>|IL2| is satisfied, reactor current IL2 is not divided but forms only current path 118b#. Reactor current IL1 is divided into current paths 115a and 115b. Here, current IL1b through current path 115b is naturally adjusted such that a condition of IL1b+IL2=0 is satisfied and switching element S4 is not conducting.

Therefore, as shown in FIG. 20, reactor current IL2 does not flow to current path 118a# but entirely flows to current path 118b#. In current path 117b, an amount of reactor current IL1 comparable to −IL2 is produced in order to render switching element S3 non-conducting, whereas a remaining amount of reactor current IL1+IL2 (IL1>0 and IL2<0) flows through current path 117a.

Consequently, a condition of I (S3)=IL2+(−IL2)=0 is satisfied in switching element S3, a condition of I (S1)=IL1+IL2 (IL1>0 and IL2<0) is satisfied in switching element S1, and a condition of I (S5)=−IL2 is satisfied in switching element S5.

In contrast to FIG. 18B, when DC power supply B1 performs the regeneration operation whereas DC power supply B2 performs the power running operation, that is, when a condition of IL1<0 and IL2>0 is satisfied, IL1 flows out of node N1 whereas IL2 flows to node N2. Therefore, since the current path in FIG. 18B is formed as being inverted, the current division effect and the current cancellation effect are exhibited for a current which passes through the switching element. Namely, a power loss in the switching element is the same as in FIG. 18B.

Consequently, as is understood from FIGS. 19 and 20, when orientations (positive/negative) of reactor currents IL1 and IL2 are different from each other (IL1>0 and IL2<0 or IL1<0 and IL2>0) while the second arm is formed, the sum of currents (absolute values) through the switching elements is |IL1|+|IL1+IL2| or |IL2|+|IL1+IL2|. Here, since IL1 and IL2 are different in sign from each other, a condition of |IL1+IL2|≤|IL1| and |IL1+IL2|≤|IL2| is satisfied. Therefore, it is understood that the sum of currents (absolute values) through the switching elements is |IL1|+|IL2| and a power loss (conduction loss) in the switching element expressed with the product of a current and a voltage is suppressed as compared with the case of formation of the first arm and Patent Document 1.

A power loss in the switching element in the parallel boost mode of power converter 10 described above is summarized. When orientations (positive/negative) of reactor currents IL1 and IL2 are the same while the first arm is formed and while the second arm is formed, a power loss in the switching element is comparable to that in Patent Document 1 in which two boost chopper circuits independently operate in parallel.

When orientations (positive/negative) of reactor currents IL1 an IL2 are different from each other while the second arm is formed, a power loss (conduction loss) in the switching element is lower than in the case of formation of the first arm and in Patent Document 1, owing to the current cancellation effect accompanying current division.

Then, a current through a switching element in the parallel boost mode of power converter 10 according to the present embodiment is compared with a current through a switching element in the parallel connection mode of the power converter described in Patent Document 2.

Figures 21, 22:
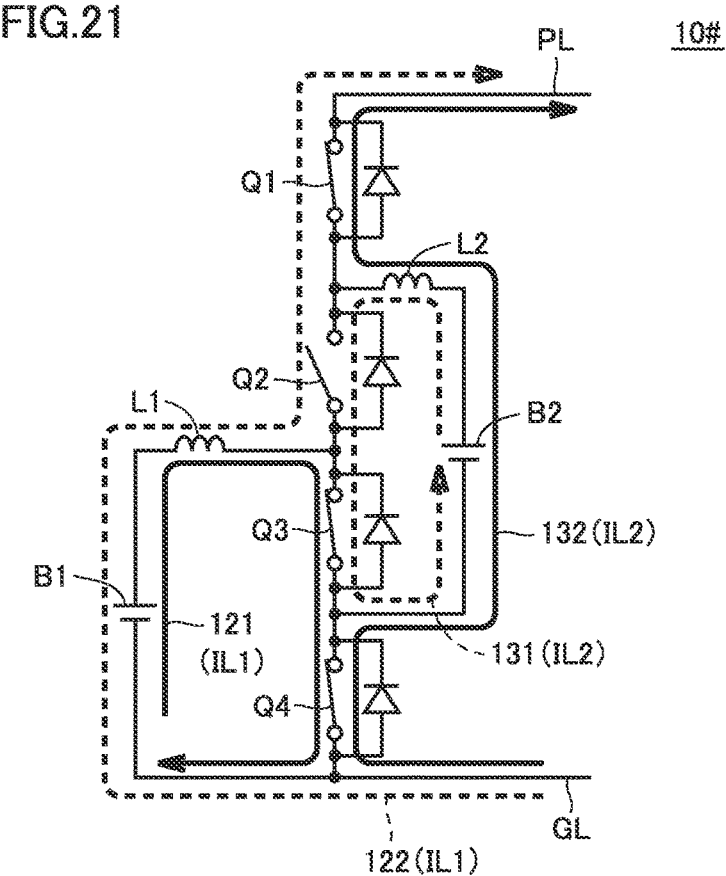
FIG. 21 is a first circuit diagram for illustrating a current path in a power converter shown for comparison.
FIG. 22 is a chart showing in a list, currents in each switching element in the power converter shown in FIGS. 21 and 23.

FIG. 21 is a circuit diagram for illustrating a current path at the time when the upper arm is turned on in one of DC power supplies B1 and B2 and the lower arm is turned on in the other thereof, in a power converter 10# shown as a comparative example.

Referring to FIG. 21, in power converter 10#, switching elements Q3 and Q4 function as the lower arm of DC power supply B1, while switching elements Q1 and Q4 function as the upper arm of DC power supply B2. Therefore, while the B1L arm (the lower arm of DC power supply B1) and the B2U arm (the upper arm of DC power supply B2) are turned on, switching elements Q1, Q3, and Q4 are turned on in accordance with the logical sum of both of them.

Thus, reactor current IL1 forms a current path 121 which goes through switching elements Q3 and Q4. Reactor current IL2 forms a current path 132 which goes through switching elements Q1 and Q4 (diodes D1 and D4). Therefore, a condition of I (Q1)=IL2 is satisfied in switching element Q1, a condition of I (Q2)=0 is satisfied in switching element Q2, a condition of I (Q3)=IL1 is satisfied in switching element S3, and a condition of I (Q4)=IL1−IL2 is satisfied in switching element Q4.

While the B1U arm (the upper arm of DC power supply B1) and the B2L arm (the lower arm of DC power supply B2) are turned on, switching elements Q1, Q2, and Q3 are turned on in accordance with the logical sum of both of them.

Thus, reactor current IL2 forms a current path 131 which goes through switching elements Q2 and Q3. Reactor current IL1 forms a current path 122 which goes through switching elements Q1 and Q2 (diodes D1 and D2). Therefore, a condition of I (Q1)=IL1 is satisfied in switching element Q1, a condition of I (Q2)=IL1−IL2 is satisfied in switching element Q2, a condition of I (Q3)=IL2 is satisfied in switching element S3, and a condition of I (Q4)=0 is satisfied in switching element Q4.

Consequently, when the upper arm is turned on in one of DC power supplies B1 and B2 and the lower arm is turned on in the other thereof as shown in FIG. 22, the sum of currents (absolute values) through switching elements Q1 to Q4 is |IL1|+|IL2|+|IL1−IL2|. Here, a condition of |IL1−IL2|≥0 is satisfied regardless of the sign of IL1 and IL2. In particular, |IL1−IL2| increases when orientations (positive/negative) of IL1 and IL2 are different from each other.

Figure 23:
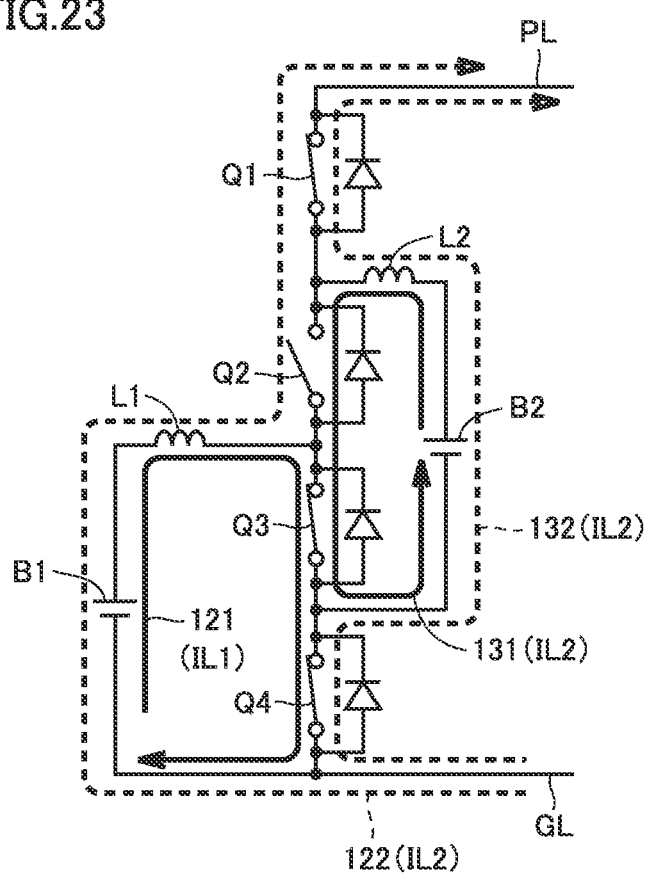
FIG. 23 is a second circuit diagram for illustrating a current path in the power converter shown for comparison.

FIG. 23 is a circuit diagram for illustrating a current path at the time when the upper arm or the lower arm is turned on in both of DC power supplies B1 and B2 in power converter 10# shown as the comparative example.

Referring to FIG. 23, in power converter 10#, when the B1L arm and the B2L arm are turned on, switching elements Q2, Q3, and Q4 are turned on in accordance with the logical sum of both of them.

Thus, reactor current IL1 forms current path 121 which goes through switching elements Q3 and Q4. Reactor current IL2 forms current path 131 which goes through switching elements Q2 and Q3. Therefore, a condition of I (Q1)=0 is satisfied in switching element Q1, a condition of I (Q2)=IL2 is satisfied in switching element Q2, a condition of I (Q3)=IL1+IL2 is satisfied in switching element S3, and a condition of I (Q4)=IL1 is satisfied in switching element Q4.

While the B1U arm and the B2U arm are turned on, switching elements Q1, Q2, and Q4 are turned on in accordance with the logical sum of both of them.

Thus, reactor current IL1 forms current path 122 which goes through switching elements Q1 and Q2 (diodes D1 and D2). Reactor current IL2 forms current path 132 which goes through switching elements Q1 and Q4 (diodes D1 and D4). Therefore, a condition of I (Q1)=IL1+IL2 is satisfied in switching element Q1, a condition of I (Q2)=IL1 is satisfied in switching element Q2, a condition of I (Q3)=0 is satisfied in switching element S3, and a condition of I (Q4)=IL2 is satisfied in switching element Q4.

Consequently, when the upper arms or the lower arms are commonly turned on in both of DC power supplies B1 and B2 as shown in FIG. 22, the sum of currents (absolute values) through switching elements Q1 to Q4 is |IL1|+|IL2|+|IL1+IL2|. Here, a condition of |IL1+IL2|≥0 is satisfied regardless of the sign of IL1 and IL2. In particular, |IL1+IL2| increases when orientations (positive/negative) of IL1 and IL2 are the same.

Thus, in power converter 10# in the comparative example, during an operation in the parallel connection mode, the sum of currents (absolute values) through the switching elements is not smaller than |IL1|+|IL2|. Therefore, it is understood that a power loss (in particular, a conduction loss) in the switching elements in the parallel connection mode in power converter 10# in Patent Document 2 is greater than in Patent Document 1 and the case of formation of the first arm in power converter 10 in which the sum of currents (absolute values) through the switching elements is |IL1|+|IL2|.

In summary, in the parallel boost mode of power converter 10 according to the present embodiment, a power loss (conduction loss) in the switching element while the first arm is formed is comparable to that in the power converter in Patent Document 1 and lower than that in the parallel connection mode of the power converter in Patent Document 2.

When orientations (positive/negative) of reactor currents IL1 and IL2 are the same while the second arm of power converter 10 is formed, a power loss (conduction loss) in the switching elements is comparable to that in the case of formation of the first arm and in the power converter in Patent Document 1.

Furthermore, when orientations (positive/negative) of reactor currents IL1 and IL2 are different from each other while the second arm of power converter 10 is formed, a power loss (a conduction loss and a switching loss) in the switching element is lower than in the case of formation of the first arm and in Patent Document 1, owing to the current cancellation effect accompanying current division.

Therefore, even when the power running/regeneration operations of DC power supplies B1 and B2 are the same throughout the entire period in which the second arm is formed, a conduction loss in the switching element is comparable to a conduction loss in the boost chopper circuit including the first arm (that is, a conduction loss in the power converter in Patent Document 1). If there is any period during which one of DC power supplies B1 and B2 performs the power running operation and the other thereof performs the regeneration operation, a conduction loss in the switching element is less than in the case of formation of the first arm.

From the foregoing, in power converter 10 according to the present embodiment, DC power supplies B1 and B2 can carry out DC/DC conversion in parallel for power lines PL and GL (load 30) such that the boost chopper circuit (FIG. 5) including the first arm and the boost chopper circuit (FIG. 8) including the second arm are both automatically used in the parallel boost mode.

Then, as a period during which the second arm is formed (the on period of switching element S5) is provided, a conduction loss in the switching element can be less than a conduction loss in the boost chopper circuit including the first arm. Therefore, in the parallel boost mode of power converter 10, by suppressing a conduction loss in the switching element as compared with that in the power converters in Patent Documents 1 and 2, DC/DC conversion can be higher in efficiency.

In particular, power converter 10 according to the present embodiment is suitable for a power supply system longer in period in which B1 and B2 are different from each other in operation (power running/regeneration) by including DC power supplies B1 and B2 different from each other in characteristics. For example, in a power supply system in which DC power supplies B1 and B2 are used in parallel simply for increasing a capacity, a period in which both of B1 and B2 perform the power running operation (discharging) or the regeneration operation (charging) depending on a state of operation of load 30 is longer. In contrast, in a power supply system in which one of DC power supplies B1 and B2 is operated at a constant output whereas the other is made use of as an electric power buffer, a period in which B1 and B2 are different from each other in operation (power running/regeneration) is longer and hence an effect of reduction in power loss (in particular, conduction loss) in the switching element can effectively be obtained by applying power converter 10 according to the present embodiment.

Modification of First Embodiment

As described above, in power converter 10 according to the first embodiment, a period during which the second arm is formed is provided, so that a power loss (conduction loss) in the switching element is reduced. On the other hand, as is understood from FIGS. 11, 12, and 15, a period during which the boost chopper circuit having the second arm is formed is limited to a period during which control pulse signals SD1 and SD2 are equal in level to each other.

Therefore, by securing a period in which control pulse signals SD1 and SD2 are equal in logical level to each other as long as possible under the condition that duty ratios DT1 and DT2 are constant, a power loss in the switching element can further be suppressed.

In the modification of the first embodiment, a power loss in power converter 10 is further reduced by controlling phases of reactor currents IL1 and IL2 in PWM control for controlling output from DC power supplies B1 and B2.

Figure 24:
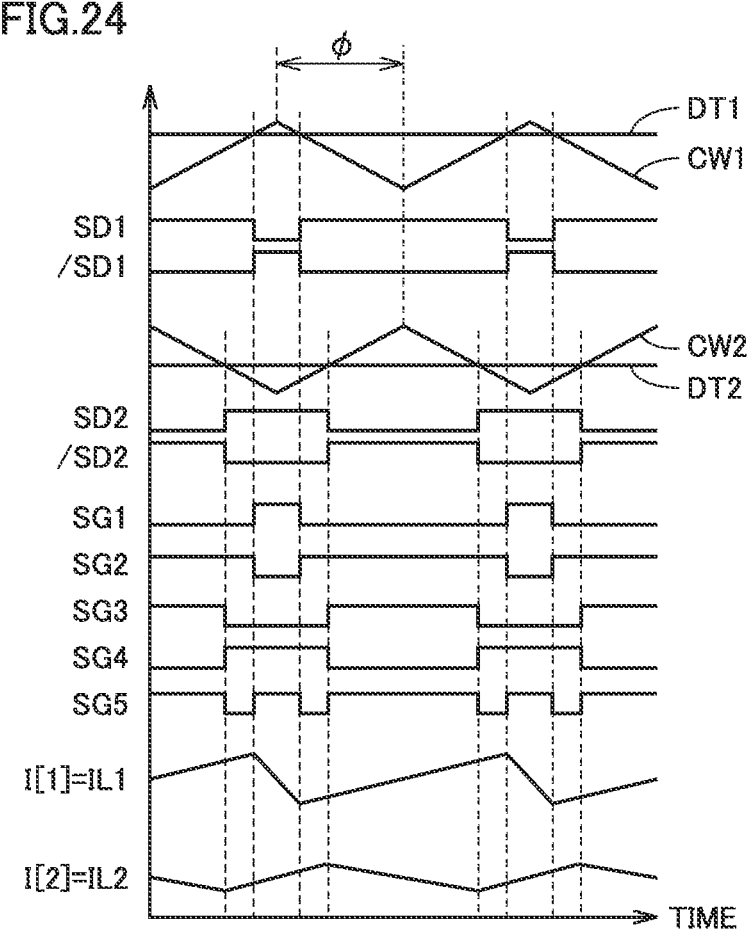
FIG. 24 is a waveform diagram for illustrating application of carrier phase control for the power converter according to the first embodiment.

FIG. 24 is a waveform diagram for illustrating a first example of PWM control according to the first embodiment. In the example in FIG. 24, phase control of a carrier wave used for PWM control (hereinafter also referred to as "carrier phase control") is applied.

Referring to FIG. 24, during application of carrier phase control, carrier wave generation portion 240 (FIG. 13) provides a phase difference φ between carrier wave CW1 used for PWM control of DC power supply B1 and carrier wave CW2 used for PWM control of DC power supply B2. FIG. 24 exemplifies a case of φ=180 degrees.

In contrast, in the operation waveform shown in FIG. 14, carrier waves CW1 and CW2 are the same in frequency and phase. In other words, in FIG. 14, a condition of φ=0 degree is satisfied.

Under the condition that phase difference φ is provided as well, control pulse signals SD1 and /SD1 are generated through PWM control based on voltage comparison between carrier wave CW1 and duty ratio DT1. Similarly, control pulse signals SD2 and /SD2 are generated through PWM control based on voltage comparison between carrier wave CW2 and duty ratio DT2.

In FIG. 24, duty ratios DT1 and DT2 are the same in value as in FIG. 14. Therefore, though control pulse signal SD1 in FIG. 24 is different in phase from control pulse signal SD1 in FIG. 14, it is the same in length of the H level period. Similarly, though control pulse signal SD2 in FIG. 24 is also different in phase from control pulse signal SD2 in FIG. 14, it is the same in length of the H level period.

By providing phase difference φ between carrier waves CW1 and CW2, control signals SG1 to SG5 in FIG. 24 are different in waveform from control signals SG1 to SG5 in FIG. 14. Based on comparison between FIGS. 14 and 24, it is understood that phase relation (current phase) between reactor currents IL1 and IL2 also changes by changing phase difference φ between carrier waves CW1 and CW2.

On the other hand, it is understood that an average value for currents IL1 and IL2 is comparable between FIGS. 14 and 24, for the same duty ratios DT1 and DT2. Namely, output from DC power supplies B1 and B2 is controlled based on duty ratios DT1 and DT2, and there is no influence even when phase difference φ between carrier waves CW1 and CW2 is changed.

Therefore, in the modification of the present first embodiment, a power loss (in particular, a conduction loss) in the switching element in the parallel boost mode of power converter 10 is reduced through carrier phase control in which phase difference φ between carrier waves CW1 and CW2 is appropriately adjusted.

As described in the first embodiment, in the parallel boost mode of power converter 10, a power loss in the switching element can be reduced by forming the second arm. On the other hand, as is understood from the Boolean expressions shown in FIG. 12, a period in which the second arm can be used by turning on switching element S5 is limited to a period in which control pulse signals SD1 and SD2 are equal in logical level to each other.

Therefore, by adjusting a pulse phase such that the period in which the control pulse signals are equal in logical level to each other is longer under the condition that a length of the H level period of control pulse signals SD1 and SD2 is defined by duty ratios DT1 and DT2, a period of use of the second arm in the parallel boost mode of power converter 10 can be longer. Thus, a power loss in the parallel boost mode of power converter 10 can further be reduced.

Figure 25:
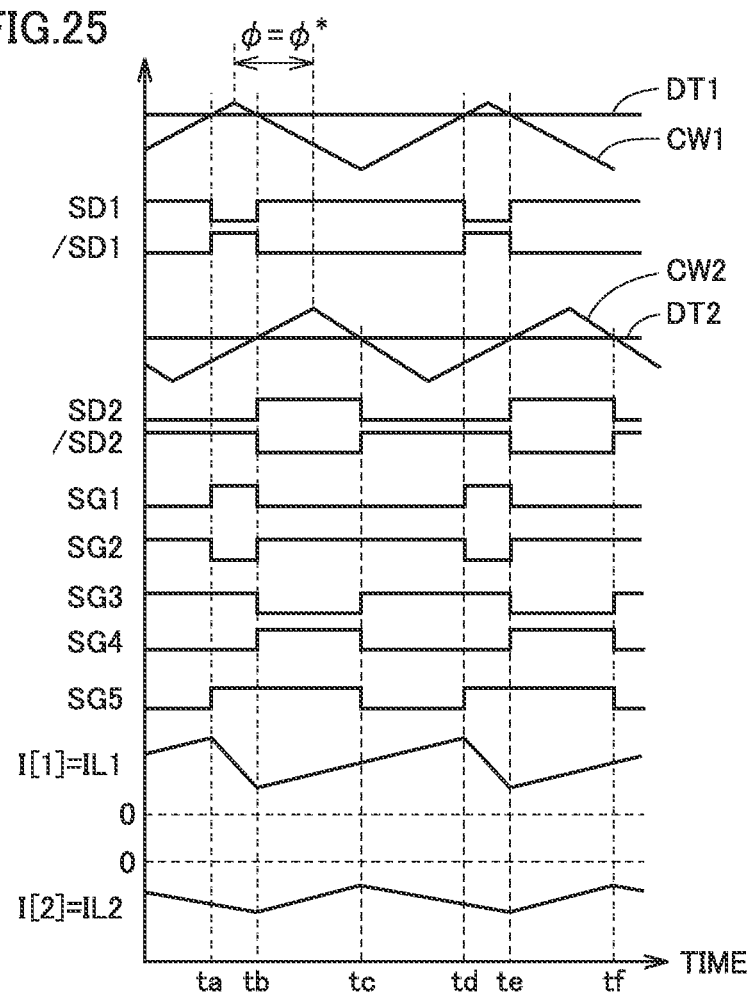
FIG. 25 is a waveform diagram for illustrating a first example of PWM control according to a modification of the first embodiment.

FIG. 25 is a waveform diagram for illustrating an operation example of carrier phase control according to the modification of the first embodiment.

Referring to FIG. 25, by adjusting phase difference φ also under the condition that control pulse signals SD1 and SD2 are the same in the H level period, a period in which control pulse signals SD1 and SD2 are equal in logical level to each other varies. As shown in FIG. 25, when a condition of phase difference φ=φ* is satisfied, timing when control pulse signal SD1 makes transition from the L level to the H level and timing when control pulse signal SD2 makes transition from the L level to the H level are the same in phase (time tb). Here, a period during which control pulse signals SD1 and SD2 are equal in logical level to each other, that is, the H level period of control signal SG5, can be secured longest. Phase difference φ* bringing about such phase relation will hereinafter be also referred to as an optimal phase difference φ*.

As is understood from comparison between a waveform of control signal SG5 at the time when a condition of phase difference φ=0 is satisfied shown in FIG. 14 and a waveform of control signal SG5 at the time when a condition of phase difference φ=φ* is satisfied shown in FIG. 25, owing to carrier phase control, under PWM control in which duty ratios DT1 and DT2 are the same, the H level period of control signal SG5, that is, a period in which the second arm is formed by turning on switching element S5, can be secured longest.

In contrast to the example in FIG. 25, when phase difference φ is set such that timing when control pulse signal SD1 makes transition from the H level to the L level (time td) and timing when control pulse signal SD2 makes transition from the H level to the L level are the same in phase as well, a period in which control pulse signals SD1 and SD2 are equal in logical level to each other can similarly be secured. Namely, phase difference φ at this time can also be set to optimal phase difference φ*.

As shown in FIG. 25, at the timing when control pulse signal SD1 (SD2) changes from the L level to the H level, reactor current IL1 (IL2) also changes from decrease to increase. Namely, reactor current IL1 (IL2) attains to a local minimum. In contrast, at timing when control pulse signal SD1 (SD2) changes from the H level to the L level, reactor current IL1 (IL2) also changes from increase to decrease. Namely, reactor current IL1 (IL2) attains to a local maximum.

Thus, timing when the logical level of control pulse signals SD1 and SD2 makes transition corresponds to an inflection point (a local maximum point or a local minimum point) of reactor currents IL1 and IL2. Therefore, as phase difference φ=φ* is set such that control pulse signals SD1 and SD2 are the same in timing of transition of the logical level, the inflection points of reactor currents IL1 and IL2 come at the same timing. Specifically, the local minimum point or the local maximum point of reactor currents IL1 and IL2 come at the same timing. By thus controlling a phase of reactor currents IL1 and IL2, a period in which the second arm is used can be maximized as above.

As is understood also from FIG. 14 and FIGS. 24 and 25, waveforms of control pulse signals SD1 and SD2 are determined by duty ratios DT1 and DT2. Therefore, it is understood that optimal phase difference φ* at which relation between control pulses SD1 and SD2 as in FIG. 25 and a current phase of IL1 and IL2 can be realized also changes in accordance with duty ratios DT1 and DT2.

Therefore, relation between duty ratios DT1 and DT2 and optimal phase difference φ* is found in advance and correspondence therebetween can be stored in control device 100 in advance as a map (hereinafter also referred to as a "phase difference map") or a function formula (hereinafter also referred to as a "phase difference calculation formula").

Therefore, while the parallel boost mode of power converter 10 is selected, carrier wave generation portion 240 (FIG. 13) can set optimal phase difference φ* by referring to the phase difference map or the phase difference calculation formula based on duty ratios DT1 and DT2 calculated by controllers 210 and 220 (FIG. 13). Furthermore, carrier wave generation portion 240 generates carrier waves CW1 and CW2 having the same frequency so as to have set optimal phase difference φ*.

PWM control unit 230 (FIG. 13) generates control pulse signals SD1 and SD2 in such phase relation that a period in which control pulse signals SD1 and SD2 are different in logical level (H/L level) from each other is longest, as shown in FIG. 25. Furthermore, control signals SG1 to SG5 are further generated in accordance with the gate Boolean expressions shown in FIG. 12.

As is clear from comparison between FIGS. 24 and 25, the number of times of turning on and off of switching element S5 can be decreased owing to current phase control above, and therefore a switching loss in switching element S5 can also be reduced.

Figure 26:
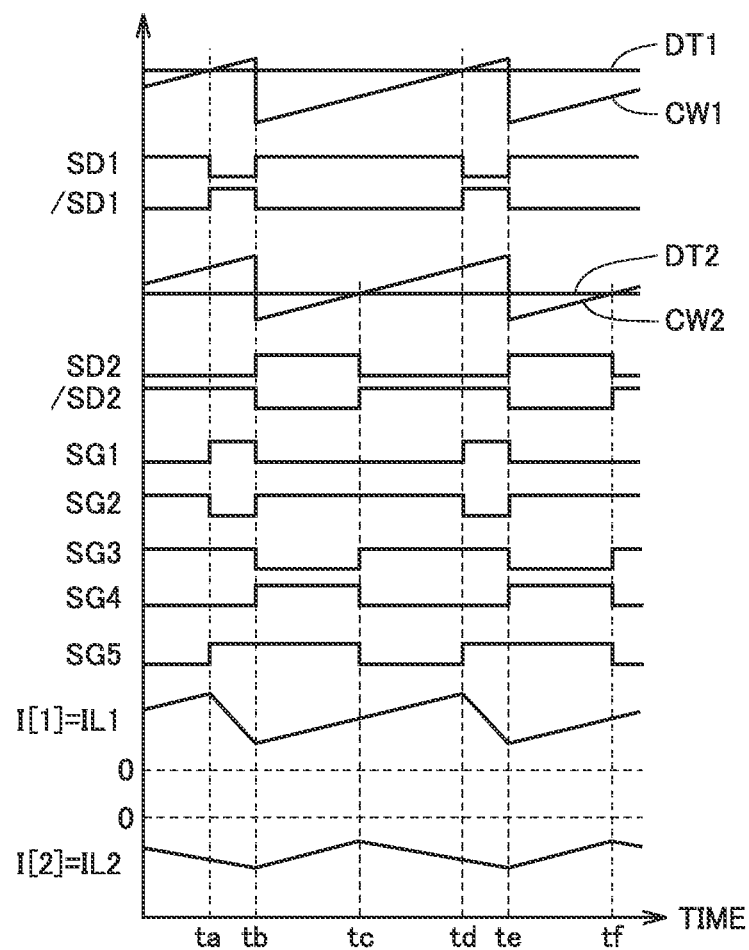
FIG. 26 is a waveform diagram for illustrating a second example of PWM control according to the modification of the first embodiment.

FIG. 26 shows a second example of PWM control according to the modification of the first embodiment, for realizing current phase control comparable to that in FIG. 25.

With FIG. 26 being compared with FIG. 25, in PWM control in FIG. 26, carrier waves CW1 and CW2 are implemented by two sawtooth waves which are equal to each other in frequency and in synchronization in phase (edge timing) with each other.

Even when carrier waves CW1 and CW2 are implemented by sawtooth waves, lengths of the H level periods of control pulse signals SD1 and SD2 with respect to duty ratios DT1 and DT2 at the same value are the same.

By implementing carrier waves CW1 and CW2 with sawtooth waves, control pulse signals SD1 and SD2 can make transition at the edge timing (time tb, te) in each period. Namely, an inflection point can appear in reactor currents IL1 and IL2 at the edge timing.

Whether the inflection points of reactor currents IL1 and IL2 appear at the local maximum point or the local minimum point is dependent on whether the sawtooth wave is positively sloped or negatively sloped. In the example in FIG. 26, both of carrier waves CW1 and CW2 are implemented by a positively sloped sawtooth wave, so that the local minimum point appears in both of reactor currents IL1 and IL2 at the edge timing (time tb, te) in each cycle. Thus, the local minimum points of reactor currents IL1 and IL2 appear at the same timing.

By implementing both of carrier waves CW1 and CW2 with a negatively sloped sawtooth wave, the local maximum point can appear in both of reactor currents IL1 and IL2 at the edge timing (time tb, te) in each cycle. Thus, the local maximum points of reactor currents IL1 and IL2 can appear at the same timing.

By thus applying sawtooth waves equal to each other in frequency, of which edge timing is in synchronization with carrier waves CW1 and CW2, the phases of reactor currents IL1 and IL2 can be controlled as in FIG. 25 even though the phases of carrier waves CW1 and CW2 are fixed.

Thus, by controlling power converter 10 under PWM control (FIG. 24 or 26) according to the modification of the first embodiment, on and off of switching elements S1 to S5 is controlled such that the on period of switching element S5, that is, the period in which the second arm is used, is longest under the condition that duty ratios DT1 and DT2 are the same. Thus, a current phase is also controlled such that the local minimum points or the local maximum points of reactor currents IL1 and IL2 come at the same timing.

Consequently, a period in which the second arm is used, in which a conduction loss in the switching element is low, can be ensured and the number of times of turning on and off of switching element S5 decreases under such a condition that duty ratios DT1 and DT2 are the same, so that DC/DC conversion in the parallel boost mode of power converter 10 can further be higher in efficiency as a result of suppression of a power loss (a conduction loss and a switching loss) in the switching element.

Second Embodiment

In a second embodiment, a modification of the circuit configuration of power converter 10 described in the first embodiment will be described. Specifically, a modification in which switching element S5 of power converter 10 shown in FIG. 1 is implemented by a bidirectional switch is shown.

Figures 27, 28:
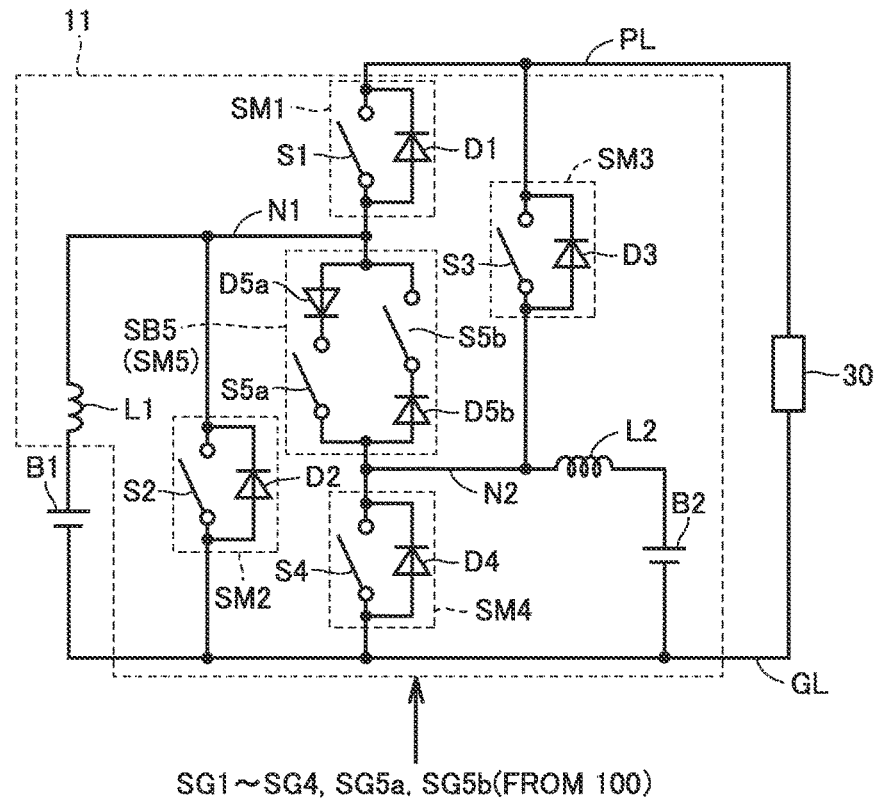
FIG. 27 is a circuit diagram for illustrating a configuration of a power converter according to a second embodiment.
FIG. 28 is a chart showing a list of gate Boolean expressions for each switching element in the parallel boost mode in the power converter according to the second embodiment.

FIG. 27 is a circuit diagram for illustrating a configuration of a power converter 11 according to the second embodiment.

Referring to FIG. 27, power converter 11 is different from power converter 10 shown in FIG. 1 in having a bidirectional switch SB5 instead of switching element S5 as a semiconductor element connected between nodes N1 and N2. Namely, bidirectional switch SB5 corresponds to "fifth semiconductor element SM5." Since other features of power converter 11 are the same as those in power converter 10, detailed description will not be repeated.

Bidirectional switch SB5 has a diode D5a and a switching element S5a electrically connected in series between nodes N1 and N2. Diode D5a is electrically connected between nodes N1 and N2 with a direction from node N1 toward node N2 being defined as a forward direction.

Bidirectional switch SB5 further has a diode D5b and a switching element S5b electrically connected in series between nodes N1 and N2. Diode D5b and switching element S5b are connected in parallel to diode D5a and switching element S5a, between nodes N1 and N2. Diode D5b is electrically connected between nodes N1 and N2, with a direction from node N2 toward node N1 being defined as the forward direction.

On and off of switching elements S5a and S5b is controlled in response to control signals SG5a and SG5b from control device 100 (FIG. 1).

In bidirectional switch SB5, when switching element S5a is turned on, a current path is formed by diode D5a in the direction from node N1 toward node N2. On the other hand, when switching element S5a is turned off, the current path in the direction from node N1 toward node N2 is cut off.

When switching element S5b is turned on, a current path is formed by diode D5b in a direction from node N2 toward node N1. On the other hand, when switching element S5b is turned off, the current path in the direction from node N2 toward node N1 is cut off.

FIG. 28 shows gate Boolean expressions for controlling on and off of switching elements S1 to S4, S5a, and S5b in the parallel boost mode of power converter 11.

Referring to FIG. 28, on and off of switching elements S1 to S4 is controlled in accordance with the gate Boolean expressions common to those in FIG. 12, in the parallel boost mode of power converter 10.

Namely, switching element S2 is turned on and off in response to control pulse signal SD1, while switching element S1 is turned on and off in response to control pulse signal /SD1. Similarly, switching element S4 is turned on and off in response to control pulse signal SD2, while switching element S3 is turned on and off in response to control pulse signal /SD2.

Switching elements S5a and S5b can commonly be turned on and off in accordance with the gate Boolean expressions common to those for switching element S5 in power converter 10. Namely, such control is possible that switching elements S5a and S5b are both turned on during the on period of switching element S5 whereas switching elements S5a and S5b are both turned off during the off period of switching element S5. Namely, each of switching elements S5a and S5b can be turned on and off in accordance with exclusive NOR (XNOR) of control pulse signals SD1 and SD2.

In a PB mode, in order not to form a short-circuiting path from power line PL to power line GL during a period in which both of the B1U arm (on of switching element Q1) and the B2L arm (switching element Q4) are turned on, a current path from node N1 toward node N2 should be cut off. It is not necessary to cut off the current path from node N1 toward node N2 except for that period. Therefore, switching element S5a can also be turned on and off in accordance with a logical sum (OR) of control pulse signals SD1 and /SD2.

Similarly, a current path from node N2 toward node N1 should be cut off during a period in which both of the B1L arm (switching element Q2) and the B2U arm (switching element Q3) are turned on. It is not necessary to cut off the current path from node N2 toward node N1 except for that period. Therefore, switching element S5b can also be turned on and off in accordance with a logical sum (OR) of control pulse signals /SD1 and SD2.

Thus, the parallel boost mode similar to that for power converter 10 can also be applied to power converter 11 (FIG. 27) according to the second embodiment. Namely, with the period in which the second arm is formed, DC power supplies B1 and B2 can carry out DC/DC conversion in parallel on power lines PL and GL (load 30).

As the period in which the second arm is formed (the on period of switching element S5) is provided also in power converter 11 according to the second embodiment, the switching element can be less in conduction loss than the boost chopper circuit including the first arm. Therefore, an effect of reduction in power loss (conduction loss) in the switching element can be enhanced by applying PWM control according to the modification of the first embodiment also to power converter 11 according to the second embodiment.

The configuration of the bidirectional switch applied to power converter 11 is not limited to the configuration exemplified in FIG. 27. Namely, a semiconductor element configured in any manner can be applied as bidirectional switch SB5 so long as it is configured to be able to independently control formation and cut-off of a bidirectional current path.

Third Embodiment

In a third embodiment, an operation mode other than the parallel boost mode of power converters 10 and 11 described in the first and second embodiments will be described.

FIG. 29 is a chart showing a list of a plurality of operation modes applied to power converters 10 and 11.

Referring to FIG. 29, the plurality of operation modes are broadly categorized into a "boost mode" in which output voltage VH is controlled in accordance with voltage command value VH* and a "direct coupling mode" in which on and off of switching elements S1 to S5 (S5a and S5b) is fixed and DC power supply (power supplies) B1 and/or B2 are/is electrically connected to power lines PL and GL.

The boost mode includes the parallel boost mode described above. In the parallel boost mode, by controlling on and off of switching elements S1 to S5 of power converter 10 in accordance with the gate Boolean expressions shown in FIG. 12, DC/DC conversion can be carried out in parallel between DC power supplies B1 and B2 and power lines PL and GL (load 30). Similarly, by controlling on and off of switching elements S1 to S5a and S5b of power converter 11 in accordance with the gate Boolean expressions shown in FIG. 28, DC/DC conversion can be carried out in parallel between DC power supplies B1 and B2 and power lines PL and GL (load 30). In the parallel boost mode, output voltage VH can be controlled in accordance with voltage command value VH* while a ratio of power allocation between DC power supplies B1 and B2 is controlled.

For power converters 10 and 11, there is no on and off pattern of switching elements S1 to S5 (S5a and S5b) in which DC power supplies B1 and B2 can be connected in series between power lines PL and GL. Therefore, there is no operation mode corresponding to the "series connection mode" in Patent Document 2 for power converters 10 and 11.

Furthermore, the boost mode includes a "mode of boost by DC power supply B1 (hereinafter a B1 boost mode)" in which only DC power supply B1 is used to carry out DC/DC conversion between the DC power supply and power lines PL and GL (load 30) and a "mode of boost by DC power supply B2 (hereinafter a B2 boost mode)" in which only DC power supply B2 is used to carry out DC/DC conversion between the DC power supply and power lines PL and GL (load 30).

In the B1 boost mode, so long as output voltage VH is controlled to be higher than V[2], DC power supply B2 is not used, with a state electrically disconnected from power line PL being maintained. In the B1 boost mode, only the boost chopper circuit (the first arm) for DC power supply B1 is implemented. Therefore, switching elements S3 and S4 are fixed to off while the current path between nodes N1 and N2 is cut off by fixing switching element S5 (S5a and S5b) to off, whereas on and off of switching elements S1 and S2 is controlled in response to control pulse signals /SD1 and SD1 based on duty ratio DT1 for controlling output from DC power supply B1.

Similarly, in the B2 boost mode, so long as output voltage VH is controlled to be higher than V[1], DC power supply B1 is not used, with a state electrically disconnected from power line PL being maintained.

In the B2 boost mode, only the boost chopper circuit (the first arm) for DC power supply B2 is implemented. Therefore, switching elements S1 and S2 are fixed to off while the current path between nodes N1 and N2 is cut off by fixing switching element S5 (S5a and S5b) to off, whereas on and off of switching elements S3 and S4 is controlled in response to control pulse signals /SD2 and SD2 based on duty ratio DT2 for controlling output from DC power supply B2.

In the B1 boost mode and the B2 boost mode, duty ratio DT1 or DT2 is calculated so as to control output voltage VH in accordance with voltage command value VH* (voltage control). Thus, in each of the operation modes belonging to the boost mode, output voltage VH is controlled in accordance with voltage command value VH*.

The direct coupling mode includes a "mode of direct coupling of DC power supply B1 (hereinafter a B1 direct coupling mode)" in which a current path to power lines PL and GL is formed only for DC power supply B1 and a "mode of direct coupling of DC power supply B2 (hereinafter a B2 direct coupling mode)" in which a current path to power lines PL and GL is formed only for DC power supply B2.

In the B1 direct coupling mode, switching element S1 is fixed to on while a current path between nodes N1 and N2 is cut off by fixing switching element S5 (S5a and S5b) to off, while switching elements S2 to S4 are fixed to off. Thus, since DC power supply B2 is disconnected between power lines PL and GL, output voltage VH is comparable to voltage V[1] of DC power supply B1 (VH=V[1]). In the B1 direct coupling mode, DC power supply B2 is not used, with a state electrically disconnected between power lines PL and GL being maintained. If the B1 direct coupling mode is applied in the state of V[2]>V[1], a short-circuiting current is produced from DC power supply B2 to DC power supply B1 via switching element S1 and diode D3. Therefore, a condition of V[1]>V[2] is required for application of the B1 direct coupling mode.

Similarly, in the B2 direct coupling mode, switching element S3 is fixed to on while a current path between nodes N1 and N2 is cut off by fixing switching element S5 (S5a and S5b) to off, while switching elements S1, S2, and S4 are fixed to off. Thus, since DC power supply B1 is disconnected between power lines PL and GL, output voltage VH is comparable to voltage V[2] of DC power supply B2 (VH=V[2]). In the B2 direct coupling mode, DC power supply B1 is not used, with a state electrically disconnected between power lines PL and GL being maintained. If the B2 direct coupling mode is applied in the state of V[1]>V[2], a short-circuiting current will be produced from DC power supply B1 to DC power supply B2 via diode D1 and switching element S3. Therefore, a condition of V[2]>V[1] is required for application of the B2 direct coupling mode.

When V[1] and V[2] are comparable to each other, a "parallel direct coupling mode" in which a state that DC power supplies B1 and B2 are electrically connected in parallel between power lines PL and GL is maintained can also be selected. In the parallel direct coupling mode, switching elements S1 and S3 are fixed to on while the current path between nodes N1 and N2 is cut off by fixing switching element S5 (S5a and S5b) to off, whereas switching elements S2 and S4 are fixed to off. Thus, output voltage VH is comparable to V[1] and V[2]. Since a voltage difference between V[1] and V[2] produces a short-circuiting current between DC power supplies B1 and B2, the parallel direct coupling mode can be applied only when the voltage difference is small.

Since output voltage VH is determined depending on voltages V[1] and V[2] of DC power supplies B1 and B2 in each of the operation modes included in the direct coupling mode, the output voltage cannot directly be controlled. Therefore, since output voltage VH cannot be set to a voltage suitable for an operation of load 30 in each operation mode included in the direct coupling mode, a power loss in load 30 may increase.

On the other hand, since each of switching elements S1 to S5 (S5a and S5b) is not turned on and off in the direct coupling mode, a power loss (a switching loss involved with turning on and off) in power converters 10 and 11 is suppressed. Therefore, depending on an operation state of load 30, a power loss in power supply system 5 as a whole may be suppressed by application of the direct coupling mode, because an amount of reduction in power loss in power converters 10 and 11 is greater than an amount of increase in power loss in load 30.

Thus, power converters 10 and 11 can control output voltage VH while a plurality of operation modes shown in FIG. 29 are selectively applied by switching a switching pattern of switching elements S1 to S5 (S5a and S5b).

In FIG. 29, the parallel boost mode corresponds to the "first mode," the B1 boost mode corresponds to the "second mode," and the B2 boost mode corresponds to the "third mode." The B1 direct coupling mode corresponds to the "fourth mode" and the B2 direct coupling mode corresponds to the "fifth mode." The parallel direct coupling mode corresponds to the "sixth mode."

Fourth Embodiment

A further modification of the configuration of power converters 10 and 11 will be described in a fourth embodiment. In the first and second embodiments (power converters 10 and 11), an example in which each of first semiconductor element SM1 to fourth semiconductor element SM4 is implemented by pairs of switching elements S1 to S4 and anti-parallel diodes D1 to D4, respectively, has been described. In addition, an example in which fifth semiconductor element SM5 is implemented by switching element S5 in which no anti-parallel diode is provided (the first embodiment) or by a pair of switching elements S5a and S5b for implementing a bidirectional switch (the second embodiment) has been shown.

Namely, a configuration in which first semiconductor element SM1 to fifth semiconductor element SM5 each include a switching element which can control formation (on) and cut-off (off) of a current path has been exemplified for power converters 10 and 11. In such a configuration example, regenerative charging can be applied to both of DC power supplies B1 and B2.

In a configuration in which one of DC power supplies B1 and B2 is not regeneratively charged, however, a structure can be simplified by omitting either a switching element or a diode in some of first semiconductor element SM1 to fourth semiconductor element SM4. Namely, such a configuration that only some of first semiconductor element SM1 to fifth semiconductor element SM5 each have a switching element is also possible in principle.

For example, when DC power supply B1 is not regeneratively charged but used only for discharging (power running), a configuration of a power converter 12a shown in FIG. 30 can be employed instead of power converter 10 shown in FIG. 1.

Referring to FIG. 30, in power converter 12a, arrangement of switching element S1 for controlling regeneration to DC power supply B1 can be omitted as compared with power converter 10 shown in FIG. 1. Namely, first semiconductor element SM1 between node N1 and power line PL can be implemented only by diode D1. In power converter 12a as well, on and off of switching elements S2 to S5 is controlled in accordance with FIG. 12 (the parallel boost mode) or FIG. 29 (other modes). Furthermore, in power converter 12a, diode D2 arranged mainly for securing a path for a regenerative current to DC power supply B1 can also be omitted.

Similarly, when DC power supply B2 is not regeneratively charged but used only for discharging (power running), a configuration of a power converter 13a shown in FIG. 31 can be employed. Referring to FIG. 31, in power converter 13a, arrangement of switching element S3 for controlling regeneration to DC power supply B2 can be omitted as compared with power converter 10 shown in FIG. 1. Namely, third semiconductor element SM3 between node N2 and power line GL can be implemented only by diode D3. In power converter 13a as well, on and off of switching elements S1, S2, S4, and S5 is controlled in accordance with FIG. 12 (the parallel boost mode) or FIG. 29 (other modes). Furthermore, in power converter 13a, diode D4 arranged mainly for securing a path for a regenerative current to DC power supply B2 can also be omitted.

A modification in which one of DC power supplies B1 and B2 is not regeneratively charged in power converter 11 (FIG. 28) according to the second embodiment will now be described.

Figure 32:
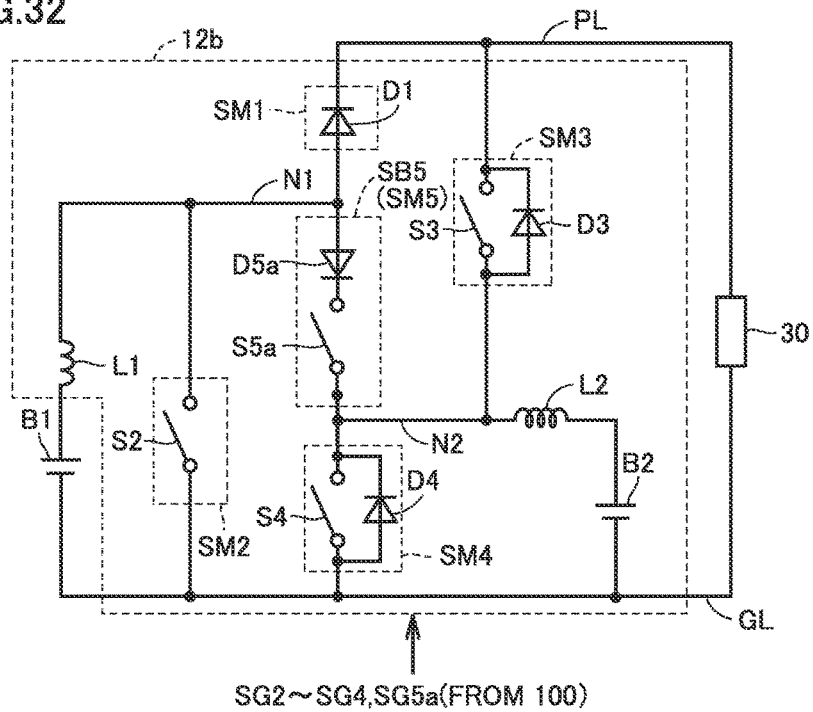
FIG. 32 is a circuit diagram showing a modification of the configuration of the power converter shown in FIG. 27 when a first DC power supply is not regeneratively charged.

When DC power supply B1 is not regeneratively charged but used only for discharging (power running), a configuration of a power converter 12b shown in FIG. 32 can also be employed instead of power converter 11 shown in FIG. 27.

Referring to FIG. 32, in power converter 12b, only switching element S5a and diode D5a in bidirectional switch SB5 are arranged instead of switching element S5, as compared with power converter 12a shown in FIG. 30. Thus, formation/cut-off of a current path from node N1 toward node N2 is controlled. Since it is not necessary to form a current path from node N2 toward node N1, which is a direction of regeneration for DC power supply B1, arrangement of switching element S5b and diode D5b in bidirectional switch SB5 is not necessary. Namely, in power converter 12b, arrangement of switching element S1 for controlling regeneration to DC power supply B1 and switching element S5b and diode D5b is omitted, as compared with the configuration of power converter 11 shown in FIG. 27. Diode D2 can also be omitted, as in power converter 12a (FIG. 30). In power converter 12b as well, on and off of switching elements S2 to S4 and S5a is controlled in accordance with FIG. 12 (the parallel boost mode) or FIG. 29 (other modes).

Figure 33:
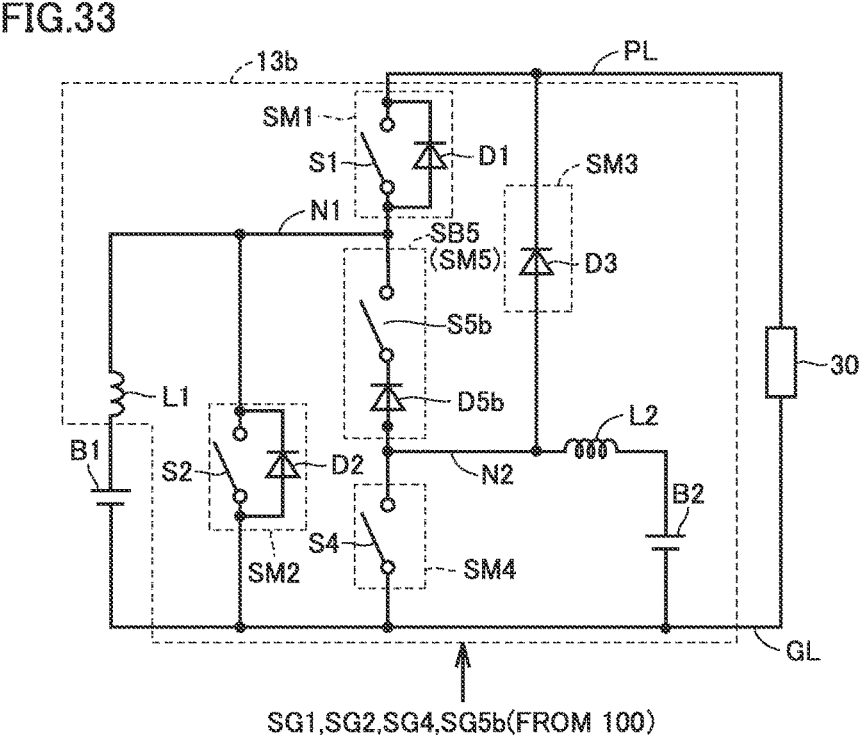
FIG. 33 is a circuit diagram showing a modification of the configuration of the power converter shown in FIG. 27 when a second DC power supply is not regeneratively charged.

When DC power supply B2 is not regeneratively charged but used only for discharging (power running), a configuration of a power converter 13b shown in FIG. 33 can also be employed instead of power converter 11 shown in FIG. 27.

Referring to FIG. 33, in power converter 13b, only switching element S5b and diode D5b in bidirectional switch SB5 are arranged instead of switching element S5, as compared with power converter 13a shown in FIG. 31. Thus, formation/cut-off of a current path from node N2 toward node N1 is controlled. Since it is not necessary to form a current path from node N1 toward node N2, which is a direction of regeneration for DC power supply B2, arrangement of switching element S5a and diode D5a in bidirectional switch SB5 is not necessary. Namely, in power converter 13b, arrangement of switching element S3 for controlling regeneration to DC power supply B2 and switching element S5a and diode D5a is omitted, as compared with the configuration of power converter 11 shown in FIG. 27. Diode D4 can also be omitted, as in power converter 13a (FIG. 31). In power converter 13b as well, on and off of switching elements S1, S2, S4, and S5b is controlled in accordance with FIG. 12 (the parallel boost mode) or FIG. 29 (other modes).

In principle, power converters 10 and 11 can also be modified to adapt to a case that neither of DC power supplies B1 and B2 is regeneratively charged but used only for discharging (power running). In this case, the modification of power converters 10 and 11 can be implemented with diodes D1 and D3 and switching elements S2 and S4 as well as switching element S5 (or bidirectional switch SB5) as minimal components.

As described above, however, power converters 10 and 11 are effective in suppressing a power loss in the switching element when any one of DC power supplies B1 and B2 performs the power running operation and the other performs the regeneration operation. Therefore, the modification as above will not be described in detail.

Though connection relation of switching elements S1 to S5 (SB5) and reactors L1 and L2 in the configuration of power converters 10 and 11 has been illustrated and described in the present embodiment, it is not intended to limit components of power converters 10 and 11 to these elements. Namely, in the present embodiment, the description components "being electrically connected" to each other encompasses the fact that other circuit elements or connector terminals are present between components and electrical connection between the components is ensured via other circuit elements.

For example, when the configuration exemplified in FIG. 1 or 27 is configured such that a circuit portion (switching elements S3 to S5 (S5a and S5b), diodes D3 and D4, reactor L2, and DC power supply B2 which remains in a general boost chopper circuit constituted of DC power supply B1, reactor L1, switching elements S1 and S2, and diodes D1 and D2 is made up as a separate unit and the unit is electrically connected to the boost chopper circuit through a connector terminal as well, the power converter and the power supply system according to the present embodiment are implemented so long as electrical connection relation among illustrated circuit elements is the same.

It is noted for confirmation purpose that load 30 can be implemented by any device in the present embodiment so long as the device operates with a DC voltage (output voltage VH). Namely, though an example in which load 30 is configured to include a motor for running of an electrically powered vehicle has been described in the present embodiment, application of the present invention is not limited to such a load.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A power supply system to control a DC voltage between a first power line on a high voltage side and a second power line on a low voltage side, the power supply system comprising:
 a first DC power supply;
 a second DC power supply;
 a power converter configured to carry out DC voltage conversion between the first and second DC power supplies and the first and second power lines; and
 a control device configured to control an operation of the power converter,
 the power converter including
  a first semiconductor element electrically connected between the first power line and a first node,
  a second semiconductor element electrically connected between the second power line and the first node,
  a third semiconductor element electrically connected between the first power line and a second node,
  a fourth semiconductor element electrically connected between the second power line and the second node,
  a fifth semiconductor element electrically connected between the first node and the second node, a first reactor electrically connected in series with the first DC power supply, between the first node and the second power line, and a second reactor electrically connected in series with the second DC power supply, between the second node and the second power line, at least some semiconductor elements including the second, fourth, and fifth semiconductor elements of the first to fifth semiconductor elements including respective switching elements configured to control formation and cut-off of a current path in response to a signal from the control device, the control device controlling on and off of the switching element in the second semiconductor element for controlling an output from the first DC power supply and controlling on and off of the switching element in the fourth semiconductor element for controlling an output from the second DC power supply, when the power converter is operated to carry out first DC voltage conversion in parallel between the first DC power supply and the first and second power lines and between the second DC power supply and the first and second power lines, the switching element being turned on and off in a manner complementary to the switching element in the second semiconductor element when the switching element is provided in the first semiconductor element, the switching element being turned on and off in a manner complementary to the switching element in the fourth semiconductor element when the switching element is provided in the third semiconductor element, and on and off of the switching element in the fifth semiconductor element being controlled such that at least the current path from the first node toward the second node is not formed during a period in which the current path is formed in both of the first and fourth semiconductor elements and at least the current path from the second node toward the first node is not formed during a period in which the current path is formed in both of the second and third semiconductor elements.

2. The power supply system according to claim 1, wherein each of the first to fourth semiconductor elements includes the switching element configured to selectively form an on state in which the current path is formed and an off state in which the current path is cut off, in response to the signal from the control device, and a diode connected in anti-parallel to the switching element and configured to form a current path during forward biasing, and the fifth semiconductor element includes the switching element configured to selectively form an on state in which a current path between the first and second nodes is formed and an off state in which the current path is cut off, in response to the signal from the control device.

3. The power supply system according to claim 1, wherein each of the first to fourth semiconductor elements includes the switching element configured to selectively form an on state in which the current path is formed and an off state in which the current path is cut off, in response to the signal from the control device, and a diode connected in anti-parallel to the switching element and configured to form a current path during forward biasing, and the fifth semiconductor element includes a first sub switching element configured to selectively form an on state in which a current path from the first node toward the second node is formed between the first and second nodes and an off state in which the current path is cut off, in response to a signal from the control device, and a second sub switching element configured to selectively form an on state in which a current path from the second node toward the first node is formed between the first and second nodes and an off state in which the current path is cut off, in response to a signal from the control device.

4. The power supply system according to claim 1, wherein the switching element configured to selectively form an on state in which the current path is formed and an off state in which the current path is cut off in response to the signal from the control device is provided in each of the second and fourth semiconductor elements, a diode connected to have a direction from the first node toward the first power line as a forward direction and a diode connected to have a direction from the second node toward the first power line as the forward direction are provided in the first and third semiconductor elements, respectively, a diode connected in anti-parallel to the switching element is provided in any one of the second and fourth semiconductor elements, the switching element configured to control formation and cut-off of at least one of the current path from the first node toward the second node and the current path from the second node toward the first node is provided in the fifth semiconductor element, and the switching element connected in parallel with the diode is further provided in any one of the first and third semiconductor elements, and the switching element selectively forms the on state and the off state in response to a signal from the control device.

5. The power supply system according to claim 2, wherein the control device controls on and off of the switching elements in the first and second semiconductor elements in accordance with an output duty ratio from the first DC power supply and controls on and off of the switching elements in the third and fourth semiconductor elements in accordance with an output duty ratio from the second DC power supply.

6. The power supply system according to claim 5, wherein the control device generates a first carrier wave used for first pulse width modulation control for controlling an output from the first DC power supply and a second carrier wave used for second pulse width modulation control for controlling an output from the second DC power supply such that local maximum points or local minimum points of currents through the first and second reactors are identical in timing.

7. The power supply system according to claim 1, wherein the power converter operates as switching among a plurality of operation modes different in manner of the DC voltage conversion, by switching a manner of on/off control of the switching element by the control device, the plurality of operation modes further include a first mode for carrying out the first DC voltage conversion, a second mode in which second DC voltage conversion is carried out between the first DC power supply and the first and second power lines and a state of electrical disconnection of the second DC power supply between the first and second power lines is maintained, and a third mode in which third DC voltage conversion is carried out between the second DC power supply and the first and second power lines and a state of electrical disconnection of the first DC power supply between the first and second power lines is maintained, in the second mode, the control device controls the DC voltage between the first and second power lines by controlling on and off of the respective switching elements in the first and second semiconductor elements, and maintains the respective switching elements in the third, fourth, and fifth semiconductor elements in the off state, and in the third mode, the control device controls the DC voltage between the first and second power lines by controlling on and off of the respective switching elements in the third and fourth semiconductor elements, and maintains the respective switching elements in the first, second, and fifth semiconductor elements in the off state.

8. The power supply system according to claim 7, wherein the plurality of operation modes further include a fourth mode in which a state that the first DC power supply is electrically connected between the first and second power lines and the second DC power supply is electrically disconnected between the first and second power lines is maintained, a fifth mode in which a state that the second DC power supply is electrically connected between the first and second power lines and the first DC power supply is electrically disconnected between the first and second power lines is maintained, and a sixth mode in which a state that the first and second DC power supplies are electrically connected in parallel between the first and second power lines is maintained.

* * * * *